(12) United States Patent
Park

(10) Patent No.: US 12,535,927 B2
(45) Date of Patent: Jan. 27, 2026

(54) DISPLAY DEVICE COMPRISING TOUCH SENSOR

(71) Applicant: Samsung Display Co., Ltd., Yongin-Si (KR)

(72) Inventor: Won Sang Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/398,166

(22) Filed: Dec. 28, 2023

(65) Prior Publication Data

US 2025/0053266 A1 Feb. 13, 2025

(30) Foreign Application Priority Data

Aug. 10, 2023 (KR) .................. 10-2023-0104905

(51) Int. Cl.
*G06F 3/044* (2006.01)
*G06F 3/041* (2006.01)
*G06F 3/047* (2006.01)
*H10K 59/40* (2023.01)

(52) U.S. Cl.
CPC .......... *G06F 3/0448* (2019.05); *G06F 3/0416* (2013.01); *G06F 3/0443* (2019.05); *G06F 3/0446* (2019.05); *G06F 3/047* (2013.01); *G06F 3/04166* (2019.05); *G06F 2203/04111* (2013.01); *G06F 2203/04112* (2013.01); *H10K 59/40* (2023.02)

(58) Field of Classification Search
CPC .... G06F 3/0416; G06F 3/0446; G06F 3/0448; G06F 2203/04112; G06F 3/0412; G06F 3/0443; G06F 1/13338; G06F 3/04166; G06F 3/042; G06F 2203/04109; G06F 2203/04111; G06F 3/04164; G06F 3/047; H10K 59/40; H10K 59/12

See application file for complete search history.

(56) References Cited

U.S. PATENT DOCUMENTS

| 8,477,120 B2 * | 7/2013 | Jang | G06F 3/0441 345/179 |
|---|---|---|---|
| 10,409,434 B2 | 9/2019 | Chang et al. | |
| 2010/0013745 A1 * | 1/2010 | Kim | H10K 59/40 345/76 |
| 2011/0175671 A1 * | 7/2011 | Reynolds | H03K 17/962 200/600 |
| 2015/0355757 A1 * | 12/2015 | Hoch | G06F 3/0448 345/174 |
| 2017/0024061 A1 * | 1/2017 | Forlines | G06F 3/0446 |

* cited by examiner

*Primary Examiner* — Julie Anne Watko
(74) *Attorney, Agent, or Firm* — Innovation Counsel LLP

(57) ABSTRACT

According to an embodiment of the present disclosure, a display device is provided. The display device includes a display part configured to emit light; and a sensing part disposed on the display part and including transmitter electrodes extending in a first direction and receiver electrodes extending in a second direction different from the first direction. Each of the transmitter electrodes includes a first pair electrode and a second pair electrode which are disposed in a transmitter column and are spaced apart from each other in the first direction.

19 Claims, 16 Drawing Sheets

DISPLAY DEVICE COMPRISING TOUCH SENSOR

CROSS-REFERENCE TO RELATED APPLICATION

This application claims priority to and benefits of Korean patent application No. 10-2023-0104905 under 35 U.S.C. § 119, filed on Aug. 10, 2023, in the Korean Intellectual Property Office, the entire content of which is incorporated herein by reference.

BACKGROUND

1. Field

This disclosure relates to a display device including a touch sensor.

2. Description of the Related Art

Recently, as interest in information display is increasing, research and development on display devices are continuously made.

The display device may include a display panel for displaying an image and a sensing panel for sensing an object. The sensing panel can be used to determine a position of a touch input provided by the user.

The sensing panel may include various panel structures to implement a touch sensing structure. For example, the sensing panel may include a contact structure that electrically connects electrodes.

When the panel structure, including the contact structure, is visible from the outside, there may be a risk that visibility of the display device will be reduced.

SUMMARY

One aspect of the present disclosure is to provide a display device including a touch sensor and having improved visibility.

According to an embodiment, a display device includes a display part configured to emit light; and a sensing part disposed on the display part and including transmitter electrodes extending in a first direction and receiver electrodes extending in a second direction different from the first direction. Each of the transmitter electrodes may include a first pair electrode and a second pair electrode which are disposed in a transmitter column and are spaced apart from each other in the second direction. The first pair electrode may include a first connection portion and a first body portion formed integrally with the first connection portion and extending in the second direction. The second pair electrode may include a second connection portion and a second body portion formed integrally with the second connection portion and extending in the second direction. The first body portion and the second body portion may overlap each other in the first direction, and the first connection portion and the second connection portion may not overlap each other in the first direction. The first body portion and the second connection portion may face each other in the second direction, and the second body portion and the first connection portion may face each other in the second direction.

According to an embodiment, the display device may include a sensor driver configured to drive the sensing part.

The sensor driver may drive the sensing part by a frequency division multiplexing (FDM) driving method.

According to an embodiment, the sensor driver may include a multi-frequency generator, a sensor receiver electrically connected to the receiver electrodes, and a sensor transmitter electrically connected to the transmitter electrodes. The multi-frequency generator may generate a first frequency signal and a second frequency signal having different frequencies. The sensor transmitter may generate a first driving signal based on the first frequency signal and generate a second driving signal based on the second frequency signal.

According to an embodiment, the first driving signal and the second driving signal may be differential signals.

According to an embodiment, the first pair electrode and the second pair electrode may form one transmitter column.

According to an embodiment, the display device may include a sensing area in which the transmitter electrodes and the receiver electrodes are disposed; and a non-sensing area surrounding at least a portion of the sensing area. The display device may further include transmitter lines disposed in the non-sensing area and electrically connected to the transmitter electrodes, respectively. The transmitter lines may be electrically connected to the first pair electrode and the second pair electrode.

According to an embodiment, the first pair electrode and the second pair electrode may be electrically separated from each other.

According to an embodiment, each of the receiver electrodes may include receiver electrode portions spaced apart in the second direction and a bridge electrically connecting the receiver electrode portions.

According to an embodiment, the receiver electrode portions may overlap the first body portion and the second body portion in the first direction.

According to an embodiment, the bridge may extend in the second direction.

According to an embodiment, the bridge may not extend in the first direction.

According to an embodiment, the transmitter electrodes and the receiver electrodes are comprised of a conductive pattern layer. The conductive pattern layer may include a first conductive pattern layer and a second conductive pattern layer disposed on the first conductive pattern layer. The bridge may be formed of the first conductive pattern layer. The receiver electrode portions may be formed of the second conductive pattern layer. The transmitter electrodes may be formed of the second conductive pattern layer.

According to an embodiment, the sensing part may further include an insulating layer disposed between the first conductive pattern layer and the second conductive pattern layer. The bridge may be electrically connected to the receiver electrodes through a contact portion formed through the first insulating layer.

According to an embodiment, the sensing part may further include a dummy contact portion in which the first insulating layer is partially removed not to expose the first conductive pattern. The contact portion may include contact portions. The dummy contact portion may overlap the bridge in a plane view and may be disposed between the contact portions.

According to an embodiment, the receiver electrode portions may include a plurality of receiver electrode portions spaced apart in the second direction and disposed in a single receiver row.

According to an embodiment, the receiver electrode portions may include a plurality of receiver electrode portions spaced apart in the first direction and disposed in a single receiver column.

According to an embodiment, the first pair electrode, the second pair electrode, and the receiver electrode portion may be formed of a same conductive layer, are formed on a same plane, and may be electrically separated from each other.

According to an embodiment, each of the first pair electrode and the second pair electrode may include a sawtooth structure formed complementary to each other.

According to an embodiment, the display device includes a light emitting element disposed on a base layer; and a sensing part disposed on the base layer and including transmitter electrodes and receiver electrodes extending in different directions. The sensing part may be driven by a frequency division multiplexing (FDM) driving method. The transmitter electrodes may include a first pair electrode and a second pair electrode spaced apart from each other in a direction and disposed in a corresponding transmitter column. Each of the first pair electrode and the second pair electrode may include a sawtooth structure formed complementary to each other.

According to an embodiment, the display device includes a light emitting element disposed on a base layer; and sensing part disposed on the base layer, and including transmitter electrodes extending in a first direction and receiver electrodes extending in a second direction different from the first direction. The sensing part may be driven by a frequency division multiplexing (FDM) driving method. The receiver electrodes may include receiver electrode portions disposed along the second direction and bridges electrically connecting receiver electrode portions disposed adjacent to each other in the second direction. Each of the bridge may extend in the second direction without extending in the first direction so as not to include a bent portion.

According to an embodiment of the present disclosure, a display device including a touch sensor and having improved visibility can be provided.

DETAILED DESCRIPTION OF THE EMBODIMENTS

Figure 1:
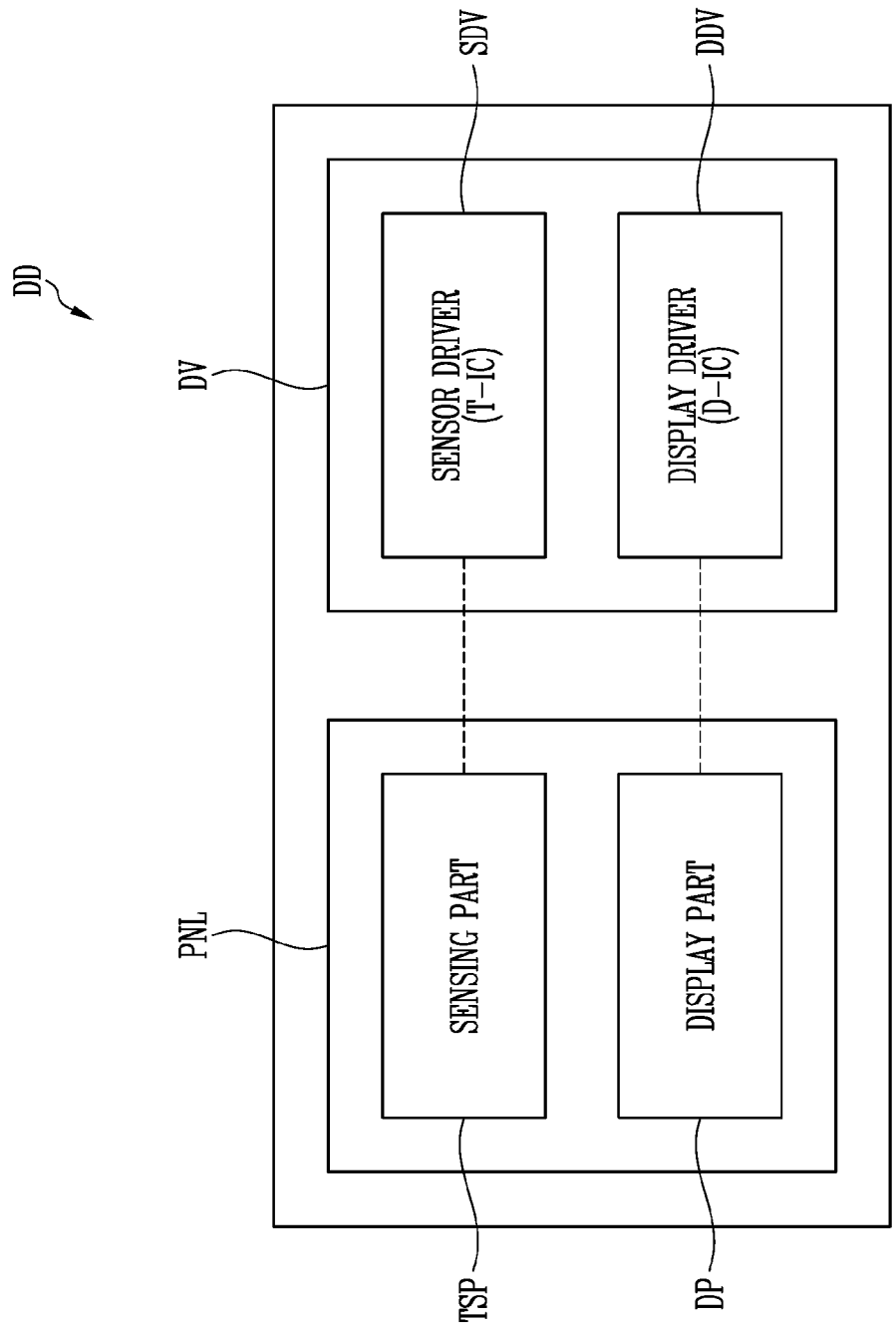
FIG. 1 is a schematic block diagram showing a display device according to an embodiment.

It will be apparent to those skilled in the art that various modifications and variations can be made in the present disclosure without departing from the spirit or scope of the disclosure, and specific embodiments are exemplified in the drawings and explained in the detailed description. Thus, it is intended that the present inventive concept covers the modifications and variations of this inventive concept provided they come within the scope of the present inventive concept and their equivalents.

The terms, 'first', 'second' and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element within the scope of the appended claims. When explaining the singular, unless explicitly described to the contrary, it may be interpreted as the plural meaning.

In the specification, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance. In addition, it will be understood that when an element such as a layer, film, area, or substrate is referred to as being "on" another element, it can be directly on the other element or intervening elements may also be present. In the specification, it will be understood that when an element such as a layer, film, area, or substrate is referred to as being disposed "on" another element, the disposed direction is not limited to an upper direction and include a side portion direction or a lower direction. In contrast, It will be understood that when an element such as a layer, film, area, or substrate is referred to as being "beneath" another element, it can be directly beneath the other element or intervening elements may also be present.

This disclosure relates to a display device including a touch sensor. Hereinafter, a display device including a touch sensor according to an embodiment will be described with reference to accompanying drawings.

Figure 2:
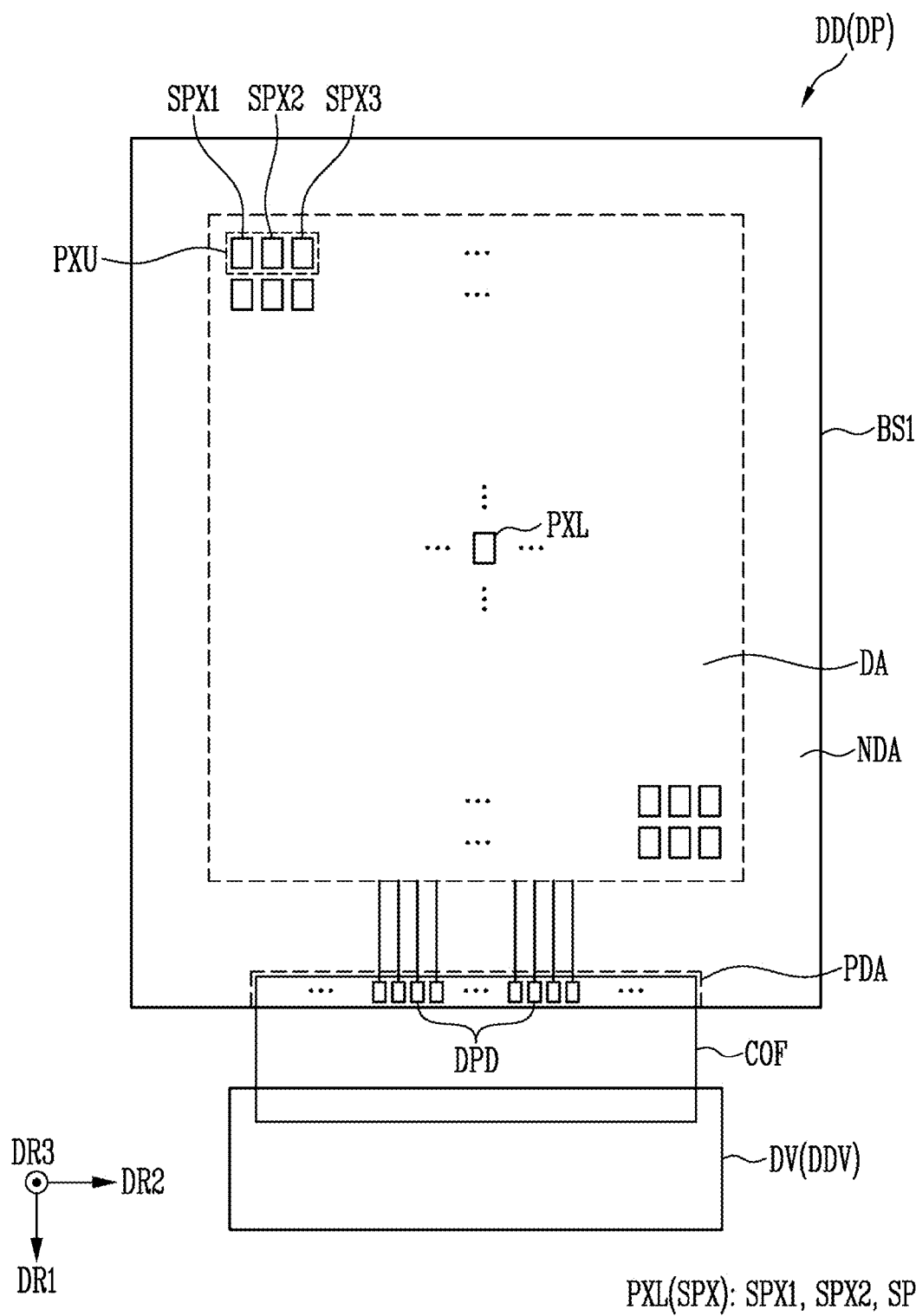
FIGS. 2 and 3 are schematic plan views showing a display device according to an embodiment.
Figure 3:
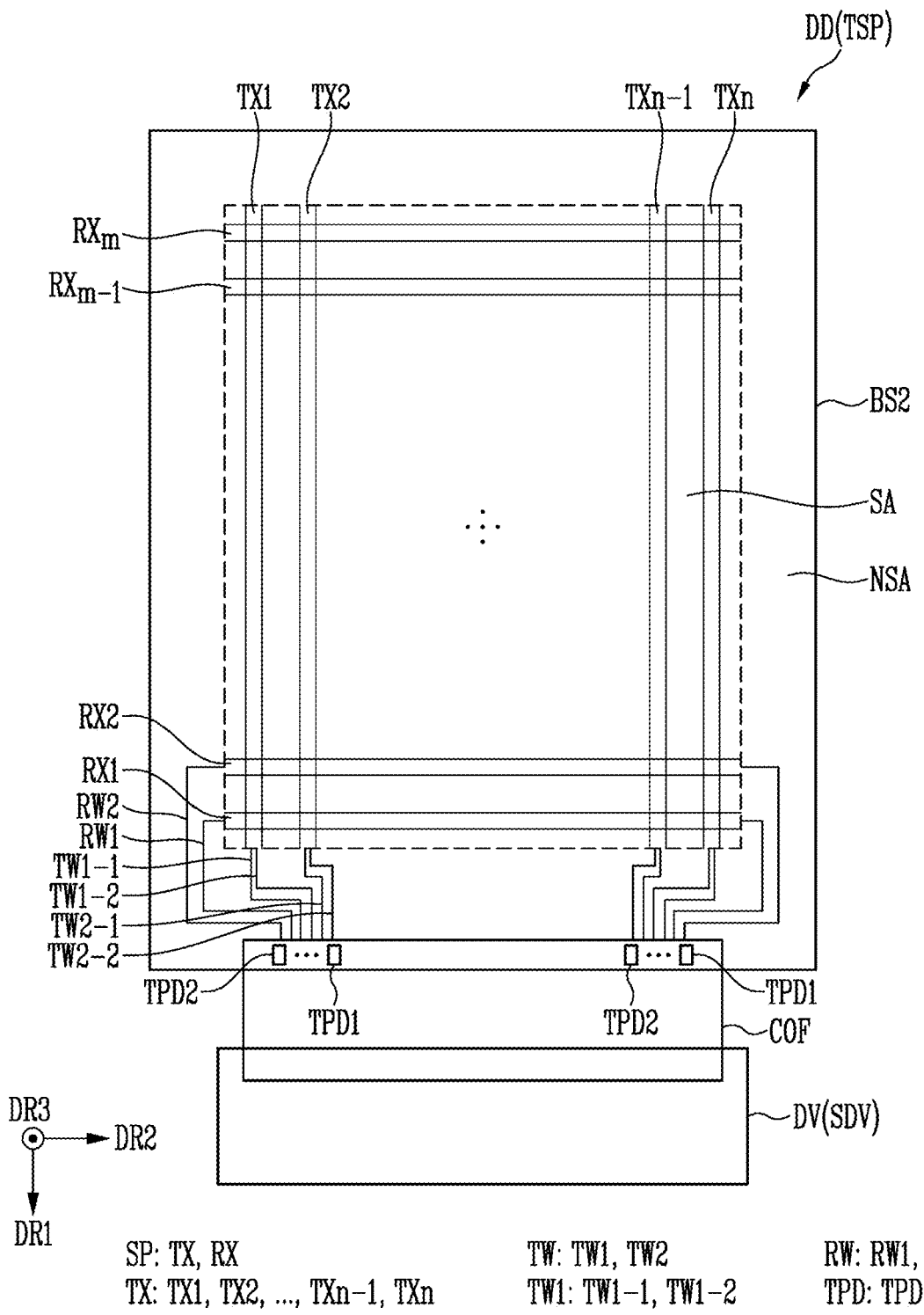

With reference to FIGS. 1 to 3, the display device DD including the display part DP and the sensing part TSP will be described.

FIG. 1 is a schematic block diagram showing a display device according to an embodiment. FIGS. 2 and 3 are schematic plan views showing a display device according to an embodiment. For example, FIG. 2 may schematically show the display part DP and the display driver DDV of the display device DD according to an embodiment. FIG. 3 may schematically show the sensing part TSP and the sensor driver SDV of the display device DD according to an embodiment.

According to an embodiment, the display device DD is configured to provide (or emit) light. The display device DD includes a panel PNL and a driving circuit part DV for driving the panel PNL.

The panel PNL may include the display part DP configured to display an image and the sensing part TSP configured to sense a user input (e.g., touch input).

The display part DP may include pixels PXL. The sensing part TSP may include sensing electrodes SP.

The driving circuit part DV may include a display driver DDV configured to drive the display part DP and a sensor driver SDV configured to drive the sensing part TSP.

According to an embodiment, the display part DP may be referred to as a display panel. The sensing part TSP may be referred to as a sensing panel or a touch sensor.

Pixels PXL may display images in units of display frame periods. The sensing electrodes SP may sense a user's input (e.g., touch input) in units of sensing frame periods.

According to an embodiment, the sensing frame period and the display frame period may be independent from each other or may be different from each other. The sensing frame period and the display frame period may be synchronized with each other or may be asynchronized.

The sensing part TSP including the sensing electrodes SP can obtain information about the user's touch input. Information about touch input (or touch event) may mean information including the position of the touch that the user provides.

According to an embodiment (e.g., mutual capacitance method), the sensing electrodes SP may include a transmitter electrode TX that provides a first sensing signal (e.g., driving signal or transmit signal) and a receiver electrode RX that provides a second sensing signal (e.g., output signal or receive signal).

The display part DP may include a first base layer BS1 and pixels PXL disposed on the first base layer BS1. Pixels PXL may be disposed in the display area DA. The first base layer BS1 may be a display base layer.

The first base layer BS1 (or display device DD) may include a display area DA where an image is displayed and a non-display area NDA that is outside the display area DA. According to an embodiment, the display area DA may be disposed in a central area of the display part DP, and the non-display area NDA may be disposed adjacent to a periphery of the display area DA.

The first base layer BS1 may be a base substrate or base member for supporting the display device DD. The base layer may be a rigid substrate made of glass. Alternatively, the base layer may be a flexible substrate configured to bend, fold, roll, etc. In this case, the base layer may include an insulating material such as a polymer resin, for example, polyimide. However, the present disclosure is not particularly limited thereto.

In the display area DA, pixels PXL and scan lines and data lines electrically connected to the pixels PXL may be disposed.

The pixels PXL may be configured to receive data signals from the data lines based on turn-on level scan signals supplied from the scan lines, and to emit light with a brightness corresponding to the data signals. Accordingly, an image corresponding to the data signal is displayed in the display area DA.

The pixels PXL may be arranged according to an array structure within the display area DA. For example, the pixels PXL may have a stripe (e.g., S-stripe) or PENTILE™ array structures. However, the present disclosure is not necessarily limited to the above-described embodiments.

The pixel PXL may include a first sub-pixel SPX1, a second sub-pixel SPX2, and a third sub-pixel SPX3. The first sub-pixel SPX1, the second sub-pixel SPX2, and the third sub-pixel SPX3 may form a pixel unit PXU configured to emit light of various colors.

For example, each of the first sub-pixel SPX1, the second sub-pixel SPX2, and the third sub-pixel SPX3 may emit light of a color. For example, the first sub-pixel SPX1 may be a red pixel that emits red light (e.g., first color), the second sub-pixel SPX2 may be a green pixel that emits green light (e.g., second color), and the third sub-pixel SPX3 may be a blue pixel that emits blue light (e.g., third color).

Various signal lines and/or internal circuit units connected to the pixels PXL of the display area DA may be disposed in the non-display area NDA. For example, a number of signal lines for supplying various power and control signals to the display area DA may be disposed in the non-display area NDA.

The panel PNL may include a pad area PDA. The panel PNL may include display pads DPD, a chip on film COF, and a driving circuit part DV.

The display pads DPD may be disposed in the pad area PDA. The pad area PDA may be disposed in the non-display area NDA. The non-display area NDA may include a pad area PDA. For example, the pad area PDA may be disposed on a side of the display area DA.

The display pads DPD may be electrically connected to the pixels PXL in the display area DA through signal lines. The display pads DPD may be electrically connected to the display driver DDV formed (e.g., included) in the driving circuit part DV through a chip on film COF. For example, the electrical signal provided by the display driver DDV may be applied to the pixel PXL through the display pads DPD.

The chip on film COF may be electrically connected to the display pads DPD and the display driver DDV. For example, one end of the chip on film COF may be connected to (or attached to) the pad area PDA, and the other end of the chip on film COF may be connected to (or attached to) the driving circuit part DV. At least a portion of the chip on film COF may be bent.

The chip on film COF may include an insulating film and a plurality of conductive lines provided on the insulating film. The chip on film COF may be a general term for a form that includes an insulating film made of a thin film and conductive lines formed on the insulating film, and may be referred to as a tape carrier package, a flexible printed circuit board, etc. In the chip on film COF, although not shown, a semiconductor chip connected to at least some of the conductive lines may be further mounted on the insulating film.

The driving circuit part DV may include a flexible circuit board. A display driver DDV may be formed in the driving circuit part DV. The driving circuit part DV may be disposed on a back surface of the first base layer BS1 of the display part DP. One end of the driving circuit part DV may be connected to the chip on film COF having a bent shape and disposed on the back surface of the first base layer BS1, so that the driving circuit part DV may not be visible from the outside.

The sensing part TSP may obtain information about input provided by the user. The sensing part TSP is configured to recognize a touch input.

The second base layer BS2 (or display device DD) may include a sensing area SA that can sense a touch input, etc., and a non-sensing area NSA around the sensing area SA. According to an embodiment, the sensing area SA may be disposed to overlap at least one area of the display area DA. For example, the sensing area SA may be an area corresponding to the display area DA (e.g., area overlapping with the display area DA), and the non-sensing area NSA may be an area corresponding to the non-display area NDA (e.g., area overlapping with the non-display area NDA). In this case, when a touch input, etc. is provided on the display area DA, the touch input may be detected through the sensing part TSP.

The second base layer BS2 may include one or more insulating layers (e.g., first insulating layer INS1 (see FIG. 9)). For example, the first insulating layer INS1 for forming the second base layer BS2 may be disposed on the display part DP to form a base for forming the sensing electrodes SP. However, examples for forming the second base layer BS2 are not particularly limited.

The sensing area SA is an area (i.e., active area of the sensor) that can respond to a touch input. To this end, sensing electrodes SP for sensing a touch input, etc. may be disposed in the sensing area SA.

According to an embodiment, the transmitter electrode TX may extend in the first direction DR1. The electrode structure forming the transmitter electrode TX may be arranged in the first direction DR1. The transmitter electrodes TX may be sequentially disposed in the second direction DR2 and each of the transmitter electrodes TX may form a transmitter column.

According to an embodiment, the receiver electrode RX may extend in the second direction DR2. The electrode structure forming the receiver electrode RX may be arranged in the second direction DR2. The receiver electrodes RX may be sequentially disposed in the first direction DR1 and each of the receiver electrodes RX may form a receiver row.

The second direction DR2 may be different from the first direction DR1. For example, the second direction DR2 may be perpendicular to the first direction DR1.

The sensing part TSP may include a transmitter line TW, a receiver line RW, first touch sensing pads TPD1, and second touch sensing pads TPD2.

The transmitter line TW and the receiver line RW may be disposed in the non-sensing area NSA of the sensing part TSP. The non-sensing area NSA may surround at least a portion of the sensing area SA. The non-sensing area NSA may include a pad area PDA. The pad area PDA may be disposed in the non-sensing area NSA. The pad area PDA may be disposed on a side of the sensing area SA.

The transmitter electrode TX may include a plurality of transmitter electrodes TX, each forming a transmitter column. For example, the transmitter electrode TX may include first to n-th transmitter electrodes TX1 to TXn (n is an integer of 2 or more). Each of the first to n-th transmitter electrodes TX1 to TXn may extend in the first direction DR1 and may be sequentially arranged in the second direction DR2.

The transmitter line TW may be electrically connected to the transmitter electrode TX and may be electrically connected to the first touch sensing pad TPD1. According to an embodiment, the transmitter line TW may be a trace line for the transmitter electrode TX.

The transmitter line TW may include a plurality of transmitter lines TW each electrically connected to different transmitter electrodes TX. For example, the transmitter line TW may include a first transmitter line TW1 electrically connected to the first transmitter electrode TX1 and a second transmitter line TW2 electrically connected to the second transmitter electrode TX2.

Meanwhile, according to an embodiment, each of the transmitter lines TW may include a pair of transmitter lines. For example, the first transmitter line TW1 may include a 1-1 transmitter line TW1-1 and a 1-2 transmitter line TW1-2. The second transmitter line TW2 may include a 2-1 transmitter line TW2-1 and a 2-2 transmitter line TW2-2.

The pair of transmitter lines may be electrically connected to each of the pair of electrodes PA1 and PA2 (see FIG. 4) of the transmitter electrode TX formed in a same transmitter column. For example, the 1-1 transmitter line TW1-1 may be electrically connected to the first pair electrode PA1 included in the first transmitter electrode TX1. The 1-2 transmitter line TW1-2 may be electrically connected to the second pair electrode PA2 included in the first transmitter electrode TX1. The 2-1 transmitter line TW2-1 may be electrically connected to the first pair electrode PA1 included in the second transmitter electrode TX2. The 2-2 transmitter line TW2-2 may be electrically connected to the second pair electrode PA2 included in the second transmitter electrode TX2.

Details regarding an embodiment in which the transmitter electrode TX forms pair electrodes PA1 and PA2 will be described later with reference to FIGS. 4 to 6.

The receiver electrode RX may include a plurality of receiver electrodes RX, each forming a receiver row. For example, the receiver electrode RX may include first to m-th receiver electrodes RX1 to RXm (m is defined independently from n and is an integer of 2 or more). Each of the first to m-th receiver electrodes RX1 to RXm may extend in the second direction DR2 and may be sequentially disposed in the first direction DR1.

The receiver line RW may be electrically connected to the receiver electrode RX and the second touch sensing pad TPD2. According to an embodiment, the receiver line RW may be a trace line for the receiver electrode RX.

The receiver line RW may include a plurality of receiver lines RW each electrically connected to different receiver electrodes RX. For example, the receiver line RW may include a first receiver line RW1 electrically connected to the first receiver electrode RX1 and a second receiver line RW2 electrically connected to the second receiver electrode RX2.

The first touch sensing pads TPD1 and the second touch sensing pads TPD2 may be disposed in the pad area PDA.

The first touch sensing pads TPD1 may be electrically connected to the transmitter electrode TX in the sensing area SA through the transmitter line TW. The second touch sensing pads TPD2 may be electrically connected to the receiver electrode RX in the sensing area SA through the receiver line RW.

The first touch sensing pads TPD1 and the second touch sensing pads TPD2 may be electrically connected to the sensor driver SDV formed in the driving circuit part DV through the chip on film COF.

For example, the electrical signal provided by the sensor driver SDV may be applied to the sensing electrodes SP through the first touch sensing pads TPD1 and the second touch sensing pads TPD2. According to an embodiment, the first touch sensing pads TPD1 may be a Tx pad, and the second touch sensing pads TPD2 may be an Rx pad.

Figure 4:
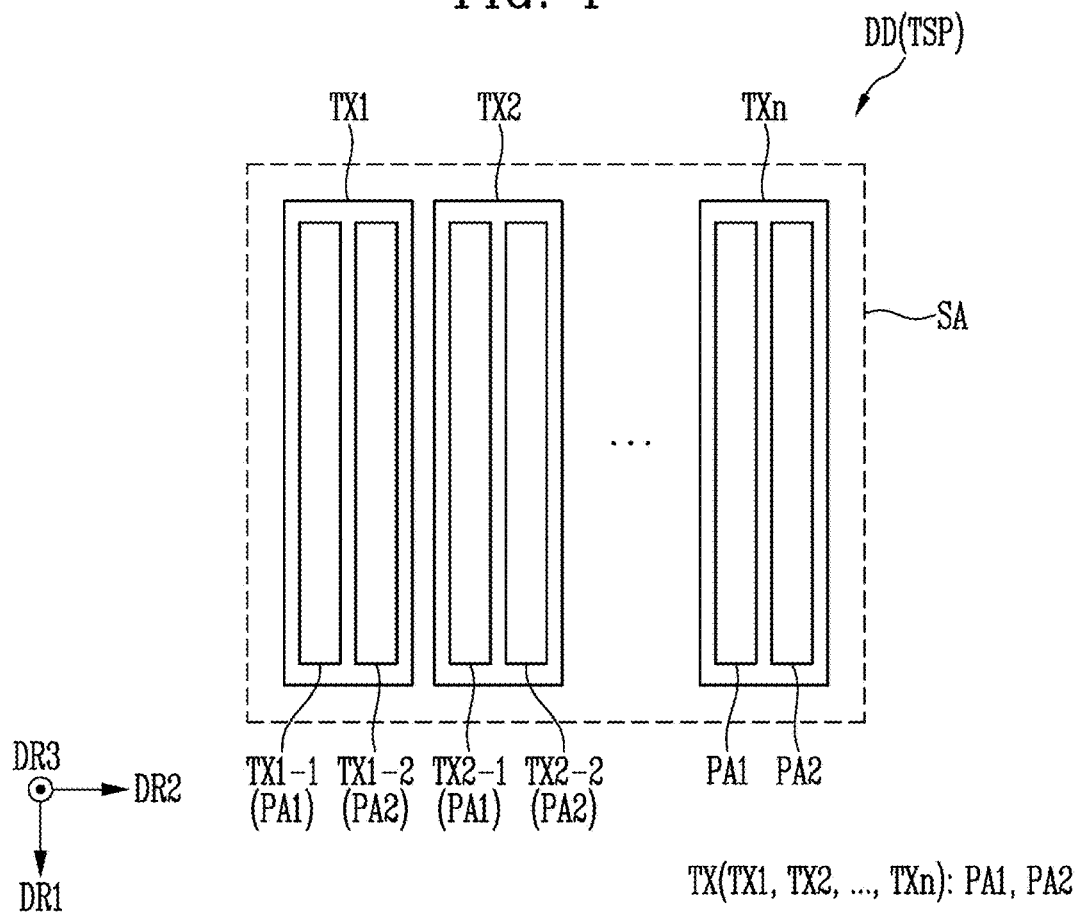
FIG. 4 is a schematic plan view showing a portion of a sensing part according to an embodiment.
Figure 5:
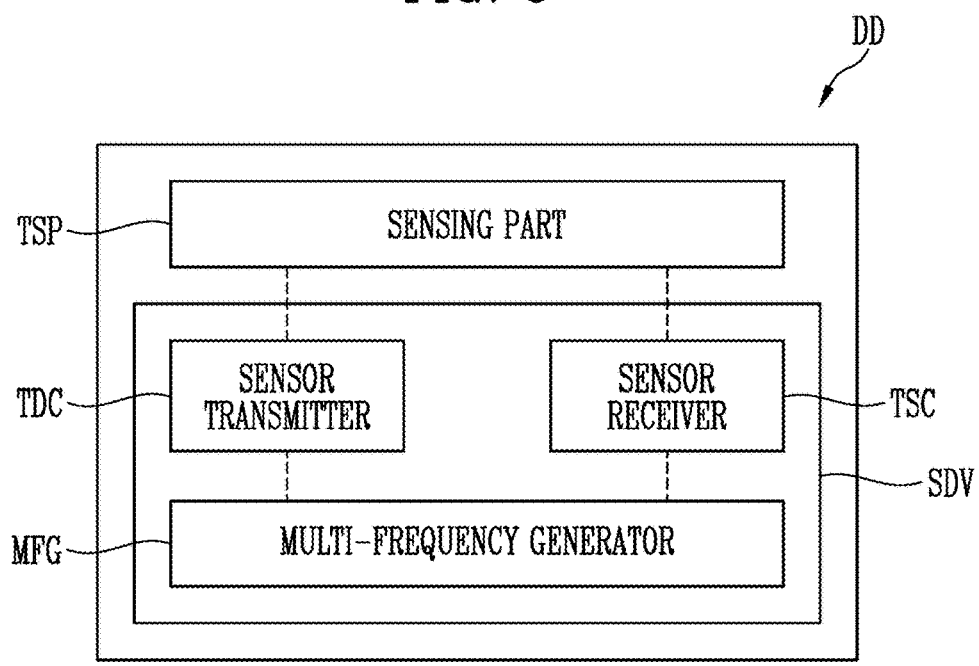
FIGS. 5 and 6 are schematic drawings showing a connection relationship between a sensing part and a sensor driver according to an embodiment.
Figure 6:
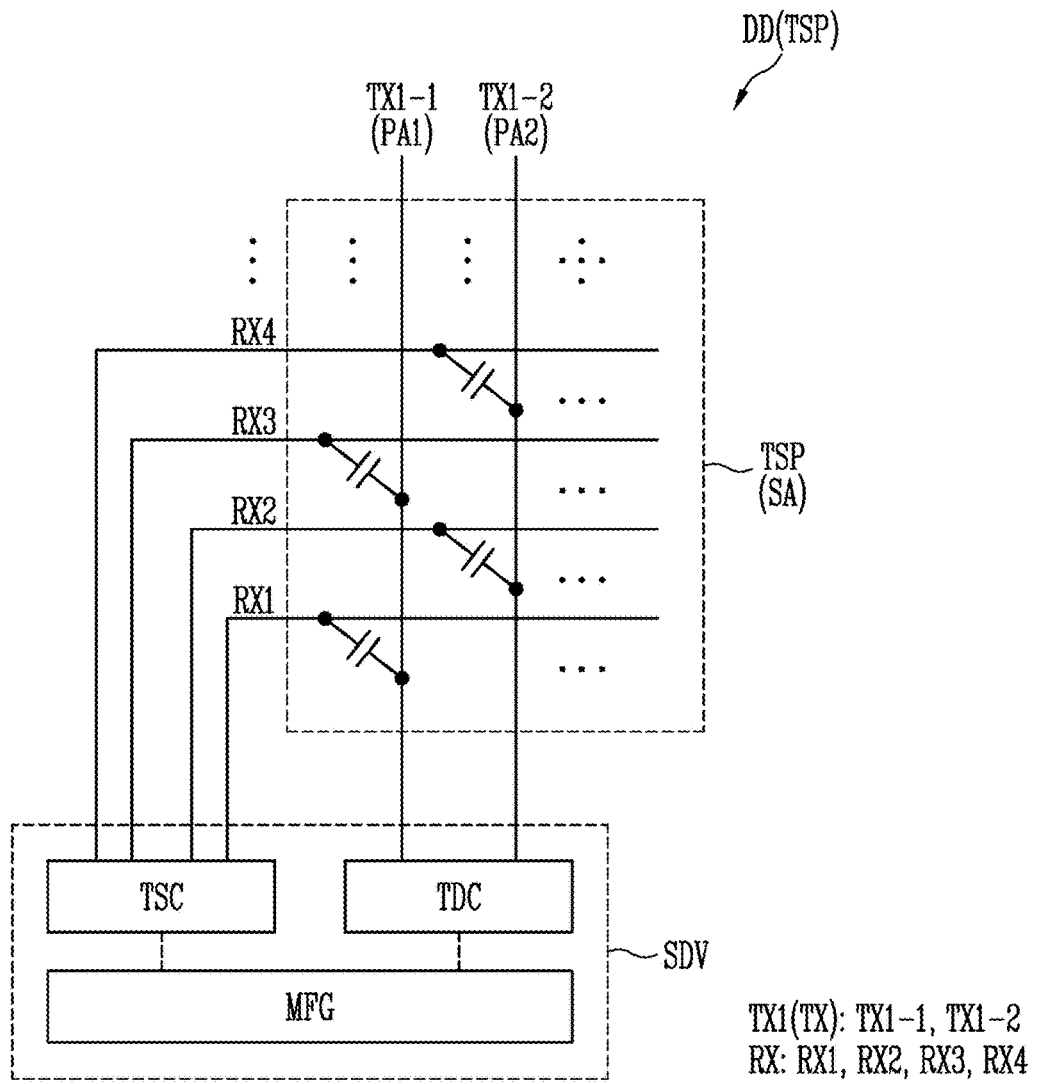

Referring to FIGS. 4 to 6, a technical description of the sensing part TSP is illustrated in relation to a structure in which the transmitter electrodes TX according to the embodiment include the first pair electrode PA1 and the second pair electrode PA2.

FIG. 4 is a schematic plan view showing a portion of a sensing part according to an embodiment. For example, FIG. 4 may schematically show a structure in which the transmitter electrodes TX according to an embodiment include the first pair electrode PA1 and the second pair electrode PA2.

FIGS. 5 and 6 are schematic drawings showing a connection relationship between a sensing part and a sensor driver according to an embodiment. For example, FIG. 5 may be a schematic block diagram showing a connection relationship between the sensing part TSP and the sensor driver SDV according to an embodiment. FIG. 6 may be a schematic plan view showing a connection relationship between the transmitter electrode TX and receiver electrode RX of the sensing part TSP and the sensor driver SDV according to an embodiment.

Referring to FIGS. 4 to 6, each of transmitter electrodes TX according to an embodiment may include pair electrodes PA1 and PA2 formed in a same transmitter column.

For example, each of the first to n-th transmitter electrodes (TX1 to TXn) (n is an integer of 2 or more) may include a first pair electrode PA1 and a second pair electrode PA2 disposed in the corresponding transmitter column.

For example, the first transmitter electrode TX1 may include the 1-1 transmitter electrode TX1-1 forming the first pair electrode PA1 and the 1-2 transmitter electrode TX1-2 forming the second pair electrode PA2. The second transmitter electrode TX2 may include the 2-1 transmitter electrode TX2-1 forming the first pair electrode PA1 and the 2-2 transmitter electrode TX2-2 forming the second pair electrode PA2.

Accordingly, one first pair electrode PA1 and one second pair electrode PA2 that are electrically separated from each other may be formed in each of the transmitter columns in the sensing area SA.

According to an embodiment, the sensing part TSP may be driven by a frequency division multiplexing (FDM) driving method. For example, the sensor driver SDV may drive the sensing part TSP using the FDM driving method.

The FDM driving method may be one of the methods for processing a touch input signal. For example, in order for the sensing part TSP to obtain information about a user's touch input, a driving signal having a spatial frequency may be applied to each of the transmitter columns. In this case, the driving signal provided to a transmitter column may include driving signals having different spatial frequency bands. Information about the touch input for a same transmitter column may be obtained based on the driving signals having different spatial frequency bands.

In this case, the sensing part TSP may be prepared to be robust to D2T (Driver-to-Touch) noise and T2D (Touch-to-Display) noise, and thus the reliability of information about the touch event provided by the user can increase.

According to an embodiment, in order for the sensing part TSP to be driven by the FDM driving method, the sensor driver SDV may include a multi-frequency generator MFG, a sensor transmitter TDC, and a sensor receiver TSC.

The multi-frequency generator MFG may generate frequency signals with different frequencies. For example, the multi-frequency generator MFG may generate a first frequency signal and a second frequency signal having different frequencies. The multi-frequency generator MFG may be implemented as a numerically controlled oscillator (NCO) to generate frequency signals. The multi-frequency generator MFG may be implemented using a same number of oscillators as the number of frequency signals.

The sensor transmitter TDC may be electrically connected to the multi-frequency generator MFG. The sensor transmitter TDC may be electrically connected to the sensing part TSP. The sensor transmitter TDC may be electrically connected to the transmitter electrode TX disposed in the sensing part TSP.

The sensor transmitter TDC may supply driving signals to the transmitter electrodes TX disposed in the sensing part TSP. The sensor transmitter TDC may be electrically connected to each of the first pair electrode PA1 and the second pair electrode PA2. For example, the sensor transmitter TDC may be electrically connected to the first transmitter electrode TX1, and the sensor transmitter TDC may be electrically connected to each of the 1-1 transmitter electrode TX1-1 and the 1-2 transmitter electrode TX1-2. For example, referring to FIG. 3, the sensor transmitter TDC in the sensor driver SDC may be electrically connected to the 1-1 transmitter electrode TX1-1 through the 1-1 transmitter line TW1-1, and the sensor transmitter TDC may be electrically connected to the 1-2 transmitter electrode TX1-2 through the 1-2 transmitter line TW1-2.

The sensor receiver TSC may receive sensing signals from the receiver electrodes RX. The sensor receiver TSC may be electrically connected to the multi-frequency generator MFG. The sensor receiver TSC may be electrically connected to the sensing part TSP. The sensor receiver TSC may be electrically connected to the receiver electrode RX.

For example, the sensor receiver TSC may be electrically connected to the first receiver electrode RX1. The sensor receiver TSC may be electrically connected to the second receiver electrode RX2. The sensor receiver TSC may be electrically connected to the third receiver electrode RX3. The sensor receiver TSC may be electrically connected to the fourth receiver electrode RX4.

According to an embodiment, the sensor transmitter TDC may supply a first driving signal to the first pair electrode PA1 based on the first frequency signal. The sensor transmitter TDC may supply a second driving signal to the second pair electrode PA2 based on the second frequency signal. According to an embodiment, the sensor transmitter TDC may simultaneously supply the first driving signal and the second driving signal to the first pair electrode PA1 and the second pair electrode PA2, respectively.

According to an embodiment, the sensor receiver TSC may receive sensing signals from the receiver electrodes RX. The sensor receiver TSC may receive and process (e.g., perform demodulation and filtering) sensing signals of various frequencies. According to an embodiment, the sensor transmitter TDC may include a modulator. The modulator may generate driving signals based on the applied frequency signal (e.g., the first frequency signal and the second frequency signal). For example, the sensor transmitter TDC may generate a first driving signal based on the first frequency signal and a second driving signal based on the second frequency signal.

According to an embodiment, the first frequency signal and the second frequency signal may be orthogonal to each other. That is, according to an embodiment, the first driving signal and the second driving signal that may be supplied to the first pair electrode PA1 and the second pair electrode PA2, respectively, may be composed of differential signals, and thus the risk that the generated driving signals interfere with each other can be reduced. For example, the first driving signal and the second driving signal may be a differential signal.

In summary, according to an embodiment, the sensing part TSP with the improved reliability of information about the touch input can be provided by using the differential signal.

Meanwhile, according to an embodiment, each of the transmitter electrodes TX may include the first pair electrode PA1 and the second pair electrode PA2, so that the electrode structure must be closely patterned and there may be a need to form a connection structure between electrode structures so that the visibility of the display device DD is not impaired.

According to an embodiment, the sensing part TSP may have a predetermined electrode structure, and thus the sensing part TSP with improved visibility may be provided. Hereinafter, with reference to FIGS. 7 to 20, the display device DD including the sensing part TSP having an electrode structure will be described.

Figure 7:
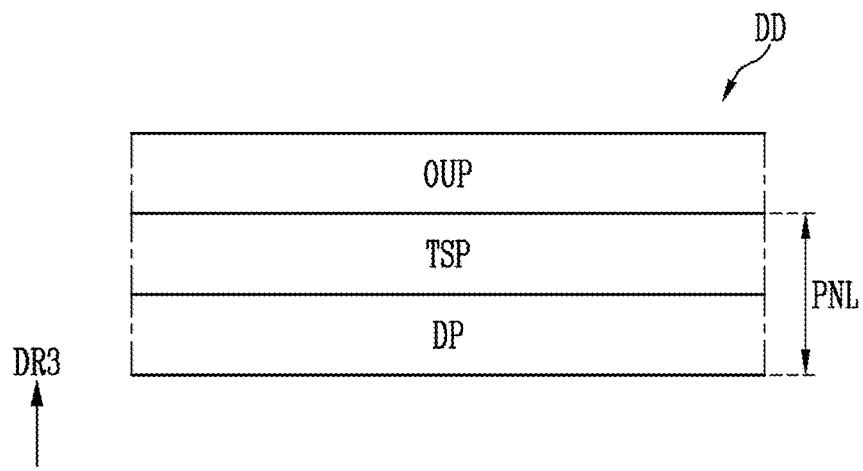
FIG. 7 is a schematic cross-sectional view illustrating a stacked structure of a display device according to an embodiment.

First, with reference to FIG. 7, a cross-sectional structure of the display device DD according to an embodiment will be described. FIG. 7 is a schematic cross-sectional view illustrating a stacked structure of a display device according to an embodiment.

Referring to FIG. 7, the sensing part TSP may be disposed on the display part DP. The display device DD may further include an outer part OUP.

The outer part OUP may be disposed on the sensing part TSP in a thickness direction (e.g., third direction DR3) of the first base layer BS1. Light provided from the display part DP may pass through the outer part OUP and may be output to the outside. According to an embodiment, the outer part OUP may include a window. According to an embodiment, the outer part OUP may include a reflection control layer RCL (see FIG. 10) and a light blocking layer LBL (see FIG. 10). According to an embodiment, the outer part OUP may further include color filters.

Figure 8:
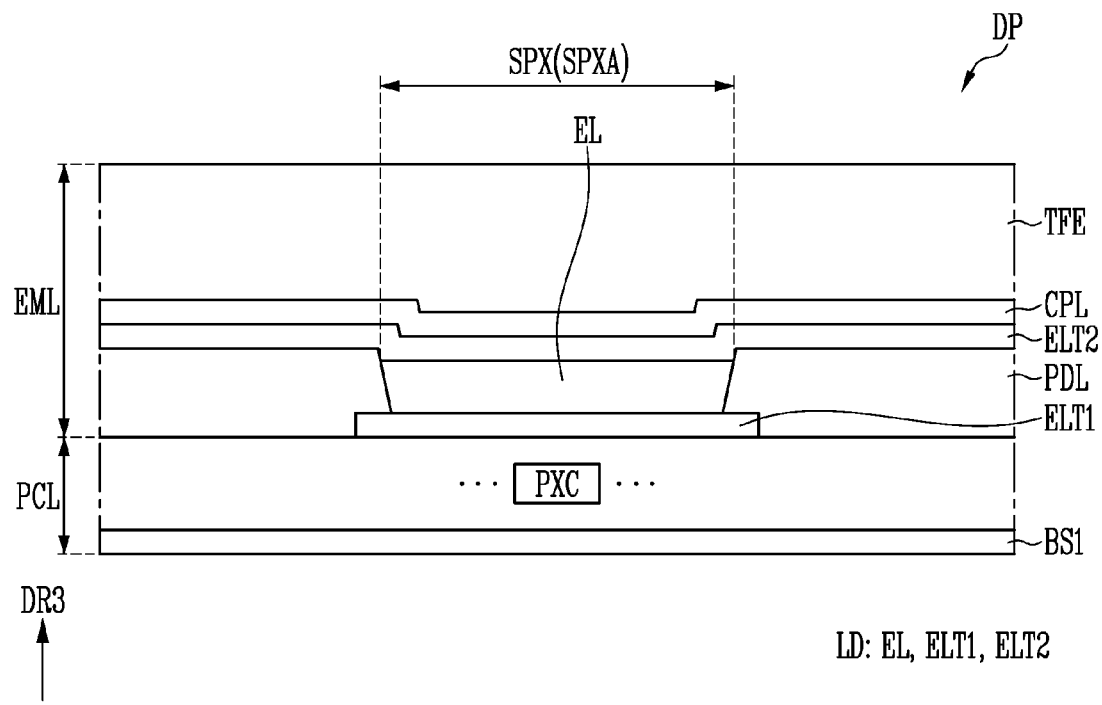
FIG. 8 is a schematic cross-sectional view showing a display part according to an embodiment.

Next, with reference to FIG. 8, an embodiment of the display part DP will be described. FIG. 8 is a schematic cross-sectional view showing a display part according to an embodiment.

Referring to FIG. 8, the display part DP may include a pixel-circuit layer PCL and a light-emitting-element layer EML.

According to an embodiment, the display part DP may output visual information (e.g., image). According to an embodiment, the type/kind of the display part DP is not particularly limited. For example, the display part DP may be implemented as a display panel of a self-luminous type such as an organic light emitting display panel. However, when the display part DP is implemented as a self-luminous type, each pixel is not necessarily limited to including only organic light emitting element. For example, the light emitting element of each pixel may be formed of an organic light emitting diode, an inorganic light emitting diode, or a quantum dot/well light emitting diode, and the like. According to an embodiment, the display part DP may be implemented as a display panel of a non-emissive type, such as a liquid crystal display panel. When the display part DP is implemented as the non-emissive type, the display device DD may further include a light source such as a back-light unit.

Hereinafter, for convenience of description, the description will be based on an embodiment in which the display part DP is implemented as an organic light emitting display panel.

The pixel-circuit layer PCL may include a pixel circuit PXC for driving the light emitting elements LD. The pixel-circuit layer PCL may include a first base layer (BS1), conductive layers for forming pixel circuits PXC, and insulating layers disposed between the conductive layers.

The pixel circuit PXC may include a driving transistor. The pixel circuit PXC may be electrically connected to the light emitting elements LD and may provide an electrical signal for the light emitting elements LD to emit light.

The light-emitting-element layer EML may be disposed on the pixel-circuit layer PCL. According to an embodiment, the light-emitting-element layer EML may include a light emitting element LD, a capping layer CPL, a pixel defining layer PDL, and an encapsulation layer TFE.

The light emitting element LD may be disposed on the pixel-circuit layer PCL. According to an embodiment, the light emitting element LD may include a first electrode ELT1, a light emitting layer EL, and a second electrode ELT2. According to an embodiment, the light emitting layer EL may be disposed in an area defined by the pixel defining layer PDL. The pixel defining layer PDL may be disposed adjacent to a periphery of the light emitting layer EL. One side of the light emitting layer EL may be electrically connected to the first electrode ELT1, and the other side of the light emitting layer EL may be electrically connected to the second electrode ELT2.

The first electrode ELT1 may be an anode electrode for the light emitting layer EL, and the second electrode ELT2 may be a common electrode (or cathode electrode) for the light emitting layer EL. According to an embodiment, the first electrode ELT1 and the second electrode ELT2 may include a conductive material. For example, the first electrode ELT1 may include a conductive material with reflective properties, and the second electrode ELT2 may include a transparent conductive material. However, the present disclosure is not limited thereto.

The light emitting layer EL may have a multilayer thin film structure including a light generation layer. The light emitting layer EL may include a hole injection layer for injecting holes, a hole transport layer that has an excellent hole transportability and blocks a migration of electrons that are not combined in a light generating layer to increase opportunities for recombination of holes and electrons, a light generation layer that emits light by recombination of injected electrons and holes, a hole blocking layer for blocking a migration of holes that are not combined in the light generation layer, an electron transport layer for smoothly transporting electrons to the light generating layer, and an electron injection layer for injecting electrons. The light emitting layer EL may emit light based on electrical signals provided from the first electrode ELT1 and the second electrode ELT2.

The light emitting layer EL may form a sub-pixel SPX. The light emitting layer EL may form a sub-pixel area SPXA from which light of one color is emitted. In a plan view, the area of the light emitting layer EL and the sub-pixel area SPXA may correspond to each other. For example, each light emitting layer EL may correspond to each sub-pixel area SPXA.

The plane defined in this specification may be a direction extending in the first direction DR1 and the second direction DR2 and may be defined based on a plane on which the first base layer BS1 is disposed. According to an embodiment, the third direction DR3 may be a thickness direction of the first base layer BS1, and the third direction DR3 may be a light exit direction of the display device DD.

The capping layer CPL may be disposed on the light emitting element LD (e.g., second electrode ELT2). The capping layer CPL may cover the second electrode ELT2. The capping layer CPL may include an inorganic material. However, the present disclosure is not limited thereto.

The pixel defining layer PDL may be disposed on the pixel-circuit layer PCL to define a position where the light emitting layer EL is arranged. The pixel defining layer PDL may include an organic material. According to an embodiment, the pixel defining layer PDL may include at least one selected from the group consisting of acrylic resin, epoxy resin, phenol resin, polyamide resin, and polyimide resin. However, the present disclosure is not limited thereto.

The encapsulation layer TFE may be disposed on the capping layer CPL. The encapsulation layer TFE planarize steps generated by the light emitting element LD and the pixel defining layer PDL. The encapsulation layer TFE may include a plurality of insulating layers that cover the light emitting element LD. According to an embodiment, the encapsulation layer TFE may have a structure in which inorganic layers and organic layers are alternately stacked. The encapsulation layer TFE may be a thin film encapsulation layer.

Next, with reference to FIG. 9, the cross-sectional structure of the sensing part TSP according to the embodiment will be described.

Figure 9:
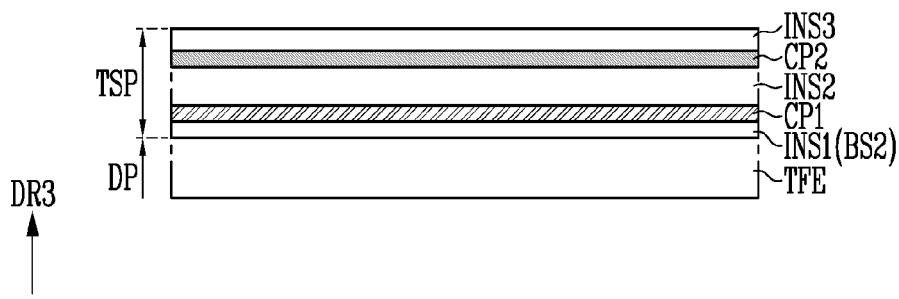
FIG. 9 is a schematic cross-sectional view showing a sensing part according to an embodiment.

FIG. 9 is a schematic cross-sectional view showing a sensing part according to an embodiment.

Referring to FIG. 9, the sensing part TSP may be disposed on the display part DP (e.g., encapsulation layer TFE). The sensing part TSP may include a first insulating layer INS1, a first conductive pattern layer CP1, a second insulating layer INS2, a second conductive pattern layer CP2, and a third insulating layer INS3.

According to an embodiment, the first conductive pattern layer CP1 and the second conductive pattern layer CP2 may be patterned in an area to form sensing electrodes SP. For example, a portion of each of the first conductive pattern layer CP1 and the second conductive pattern layer CP2 may form a receiver electrode RX, and a portion of the second conductive pattern layer CP2 may form a transmitter electrode TX. However, the present disclosure is not limited thereto.

The first insulating layer INS1 may be disposed on the encapsulation layer TFE. The first insulating layer INS1 may form a second base layer (BS2), and may provide an area on which the first conductive pattern layer CP1, the second insulating layer INS2, the second conductive pattern layer CP2, and the third insulating layer INS3 are disposed.

The first conductive pattern layer CP1 may be disposed on the first insulating layer INS1. The second conductive pattern layer CP2 may be disposed on the second insulating layer INS2. The first conductive pattern layer CP1 and the second conductive pattern layer CP2 may be spaced apart from each other with the second insulating layer INS2 interposed therebetween.

The first conductive pattern layer CP1 and the second conductive pattern layer CP2 may include a single metal layer or multiple metal layers. The first conductive pattern layer CP1 and the second conductive pattern layer CP2 may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), or the like, or alloys thereof. According to an embodiment, the first conductive pattern layer CP1 and the second conductive pattern layer CP2 may include at least one of various transparent materials including silver nanowires (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, and graphene.

The second insulating layer INS2 may be disposed on the first conductive pattern layer CP1. The second insulating layer INS2 may be interposed between the first conductive pattern layer CP1 and the second conductive pattern layer CP2. The third insulating layer INS3 may be disposed on the second conductive pattern layer CP2.

Each of the first insulating layer INS1, the second insulating layer INS2, and the third insulating layer INS3 may include an inorganic material. The inorganic material may include at least one selected from the group consisting of silicon nitride (SiNx), silicon oxide (SiOx), silicon oxynitride (SiOxNy), and aluminum oxide (AlOx). According to an embodiment, at least a portion of each of the first insulating layer INS1, the second insulating layer INS2, and the third insulating layer INS3 may include an organic material. The organic material may include at least one selected from the group consisting of acrylic resin, epoxy resin, phenol resin, polyamide resin, and polyimide resin. However, the present disclosure is not limited thereto.

Next, with reference to FIG. 10, a cross-sectional structure of the display device DD according to an embodiment will be described.

Figure 10:
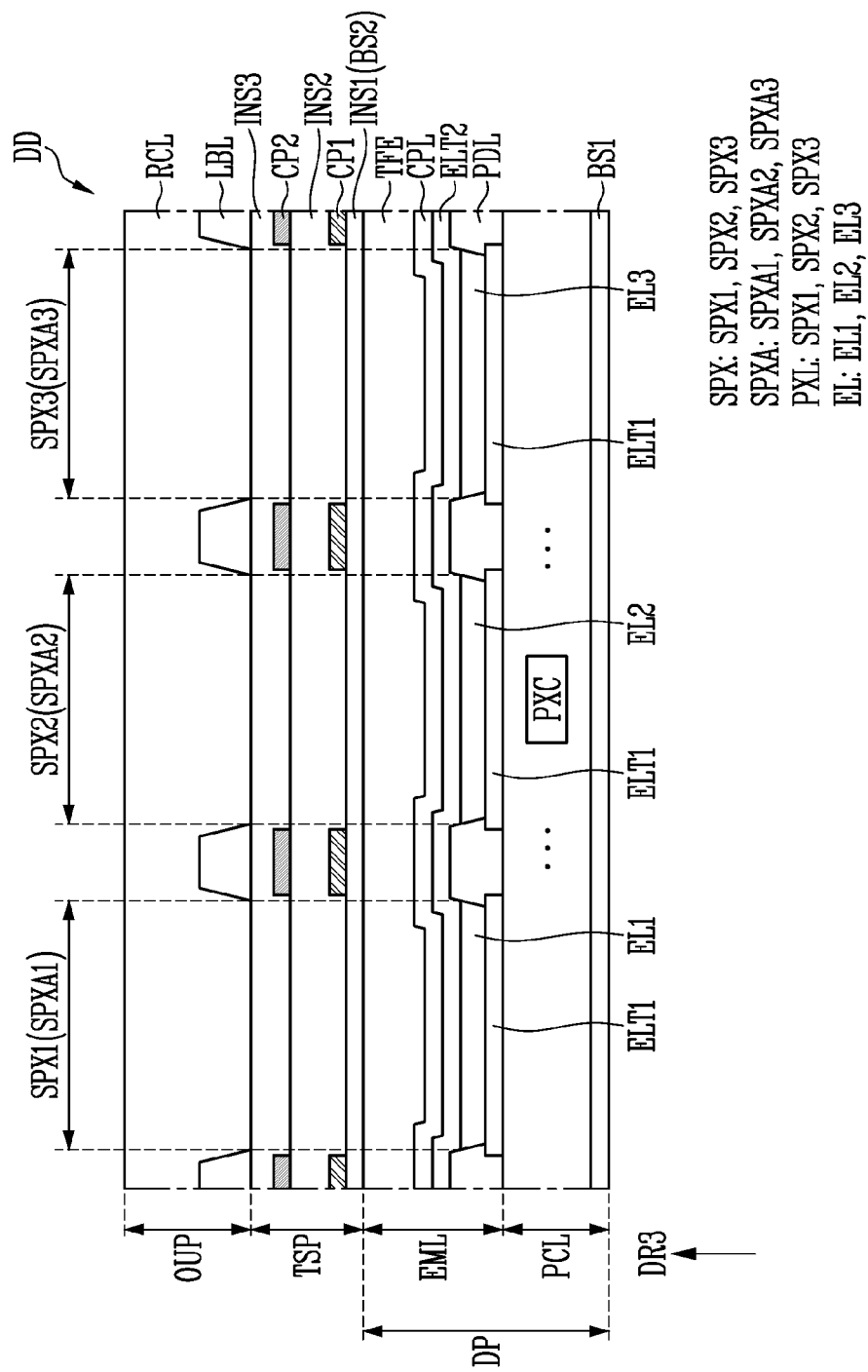
FIG. 10 is a schematic cross-sectional view showing a display device according to an embodiment.

FIG. 10 is a schematic cross-sectional view showing a display device according to an embodiment.

Referring to FIG. 10, the light emitting layer EL may include a first light emitting layer EL1 included in the first sub-pixel SPX1, a second light emitting layer EL2 included in the second sub-pixel SPX2, and a third light emitting layer EL3 included in the third sub-pixel SPX3. The first light emitting layer EL1 may emit light of a first color (e.g., red) and form the first sub-pixel area SPXA1. The second light emitting layer EL2 may emit light of a second color (e.g., green) and form the second sub-pixel area SPXA2. The third light emitting layer EL3 may emit light of a third color (e.g., blue) and form the third sub-pixel area SPXA3. However, the present disclosure is not necessarily limited thereto. According to an embodiment, the first to third light emitting layers EL1, EL2, and EL3 may emit light of a same color, and the display device DD may provide a full-color sub-pixel structure further including a color filter layer and/or a quantum-dot layer.

In the sensing part TSP, the first conductive pattern layer CP1 and the second conductive pattern layer CP2 may be disposed on different layers to form a structure of sensing electrodes SP.

The outer part OUP may be disposed on the sensing part TSP. The outer part OUP may include a light blocking layer LBL and a reflection adjustment layer (RCL).

The light blocking layer LBL may overlap the first conductive pattern layer CP1 and the second conductive pattern layer CP2 in a plane view. The light blocking layer LBL may include a light blocking material, but the present disclosure is not necessarily limited thereto.

The reflection control layer RCL can selectively absorb light in a wavelength range and control reflectance and color of the display device DD. According to an embodiment, the reflection control layer RCL may include dye, pigment, or a combination thereof. For example, the reflection control layer RCL may include at least one selected from the group consisting of oxazine-based compounds, cyanine-based compounds, tetraazoporphine-based compounds, and squarylium-based compounds, but the present disclosure is not limited thereto.

The cross-sectional structure of the display device DD according to the embodiment is not necessarily limited to the above-described embodiment.

Hereinafter, with reference to FIGS. 11 to 20, electrodes and lines forming the sensing part TSP according to the embodiment will be described in more detail. Duplicate description is briefly explained or not repeated.

First, with reference to FIGS. 11 to 17, the display device DD including the sensing part TSP according to an embodiment will be described.

Figure 11:
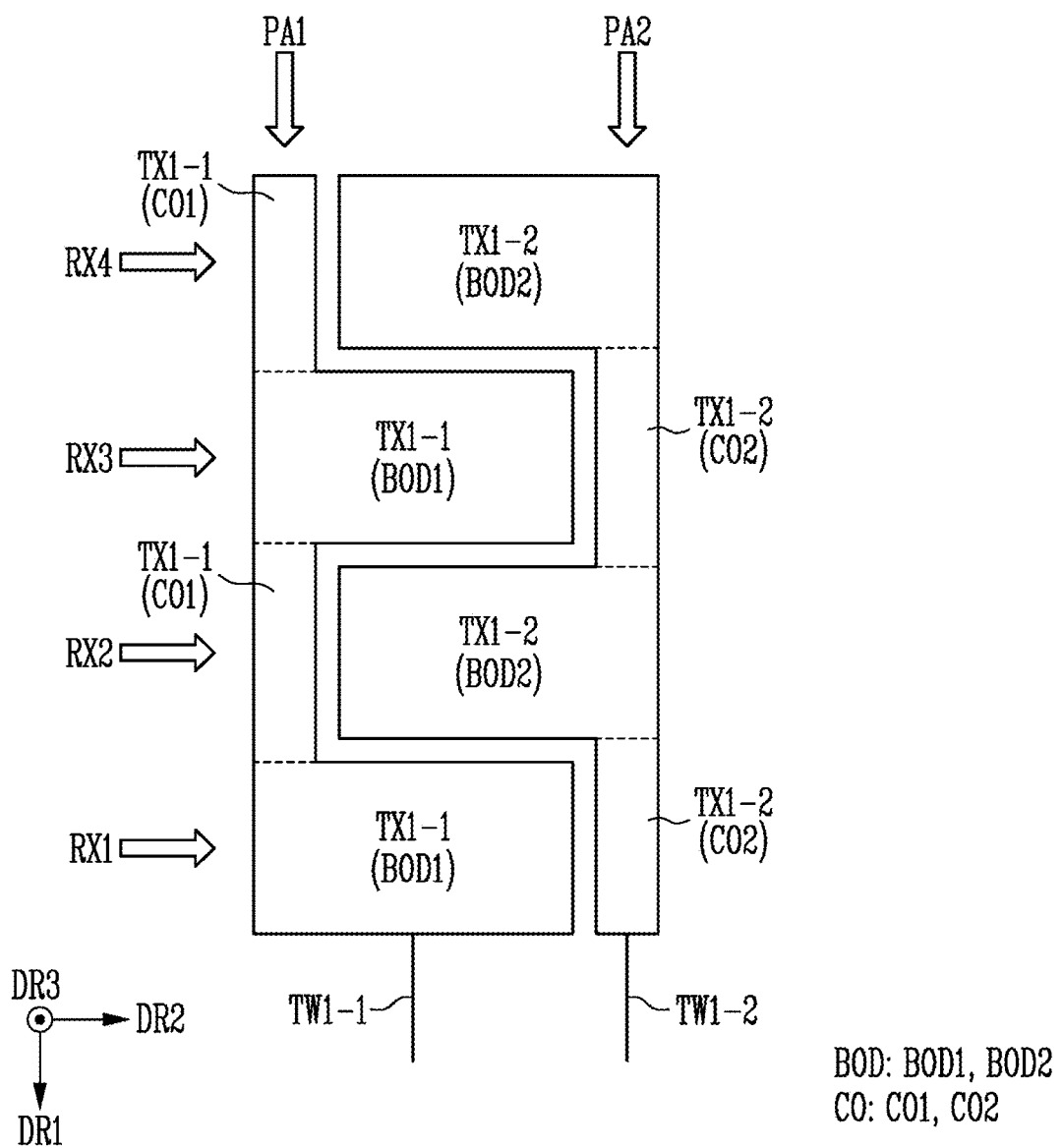
FIG. 11 is a schematic plan view showing a structure of pair electrodes according to an embodiment.

FIG. 11 is a schematic plan view showing a structure of pair of electrodes according to an embodiment.

Figure 12:
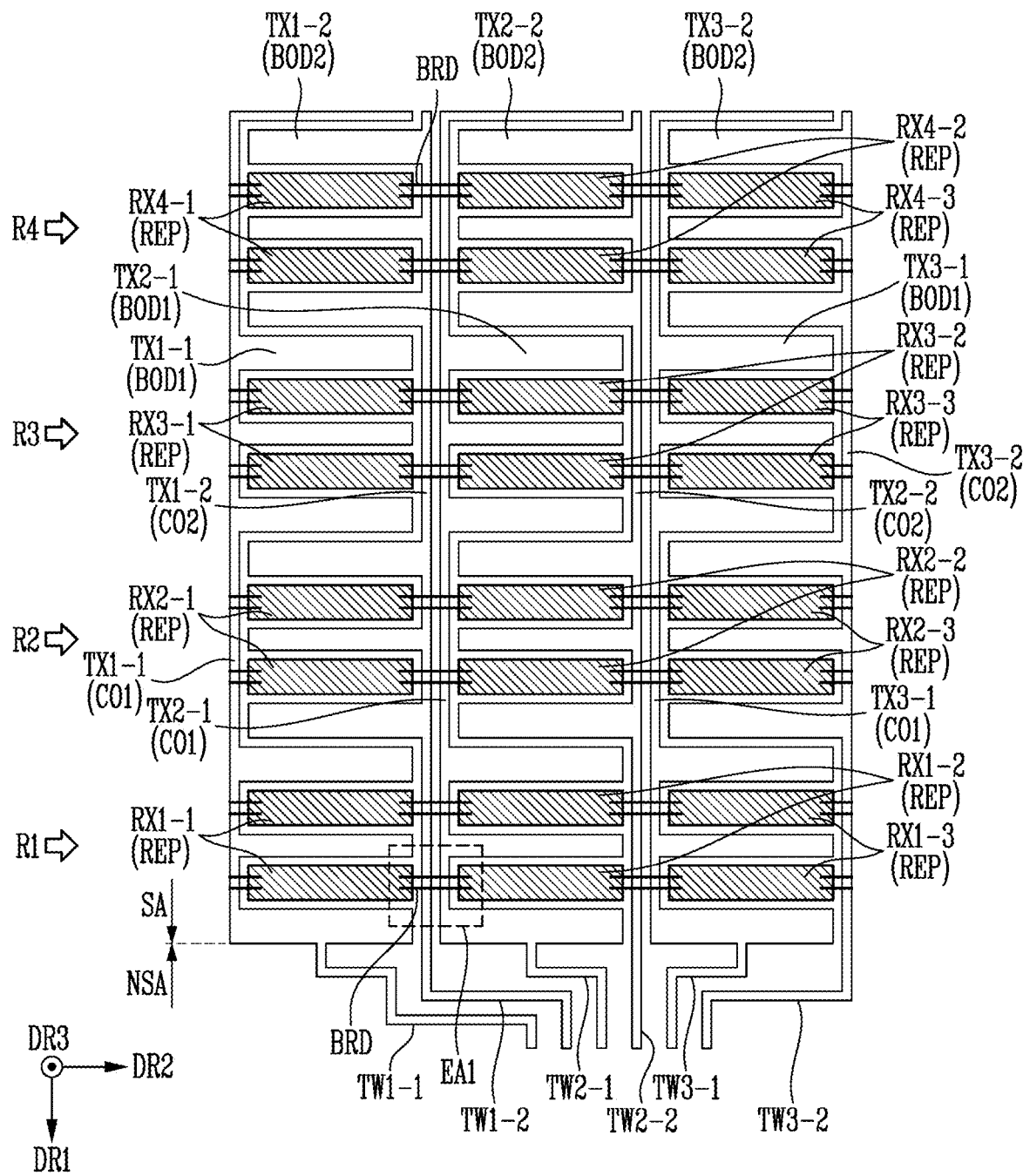
FIGS. 12 and 13 are schematic plan views showing a sensing part according to an embodiment.
Figure 13:
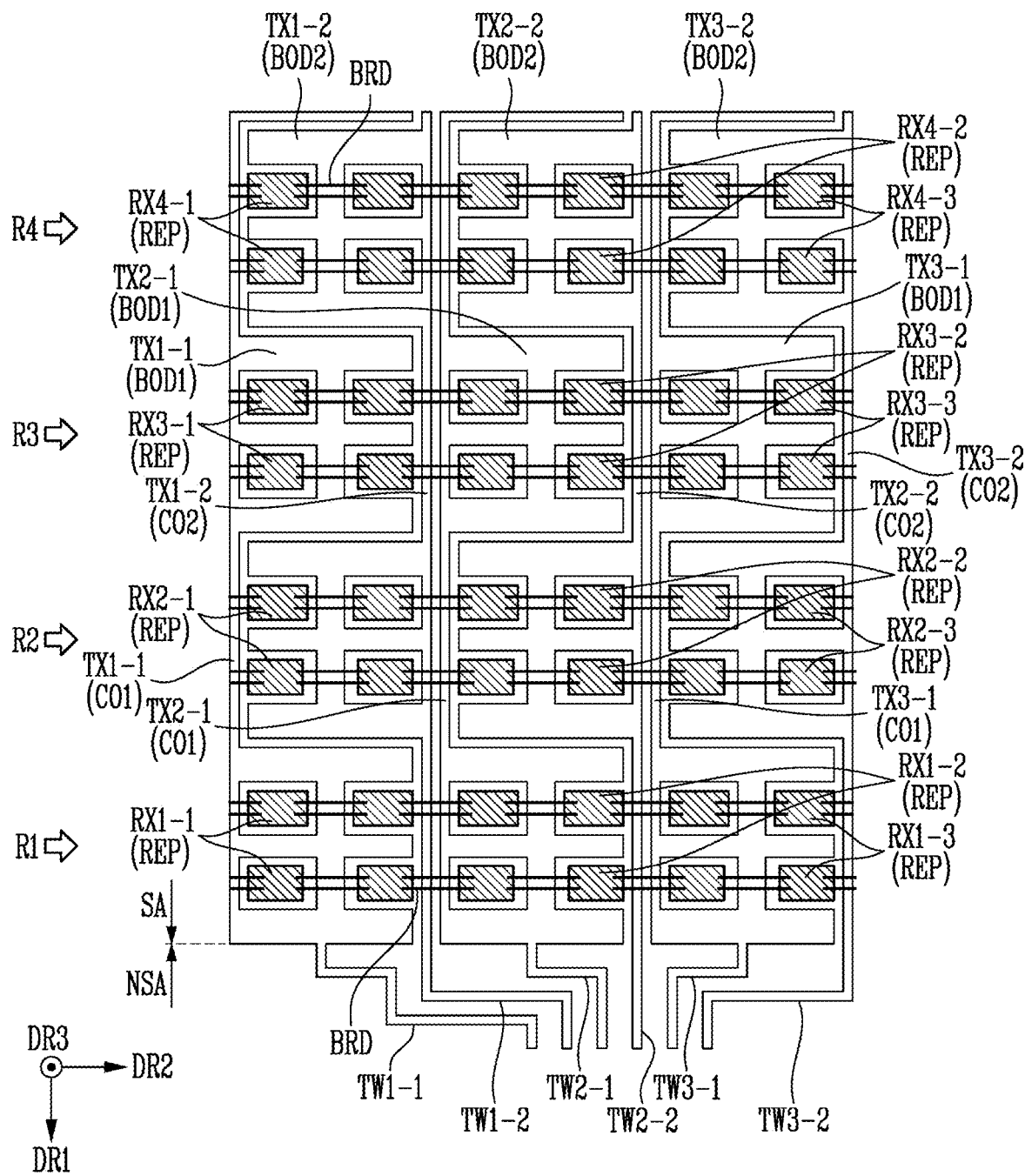

FIGS. 12 and 13 are schematic plan views showing a sensing part according to an embodiment. FIGS. 12 and 13 schematically show first to third transmitter electrodes (TX1 to TX3) and first to fourth receiver electrodes (RX1 to RX4). for convenience of description, the first pair electrode PA1, the second pair electrode PA2, and the receiver electrode RX are shown in FIGS. 12 and 13 with different patterning.

Figure 14:
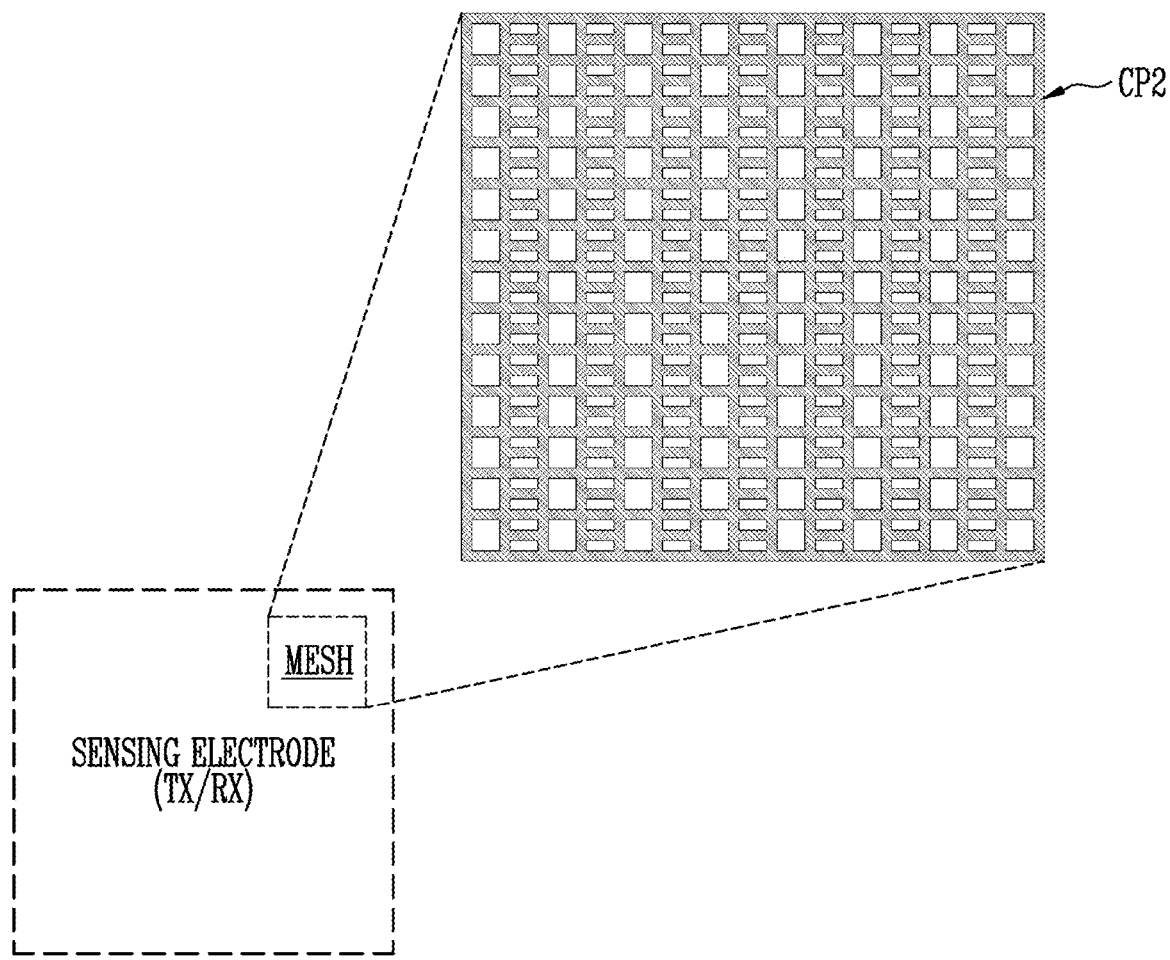
FIG. 14 is a schematic plan view showing a mesh structure of sensing electrodes according to an embodiment.

FIG. 14 is a schematic plan view showing a mesh structure of sensing electrodes according to an embodiment. FIG. 14 schematically shows a mesh structure of the transmitter electrode TX and the receiver electrode RX.

Figure 15:
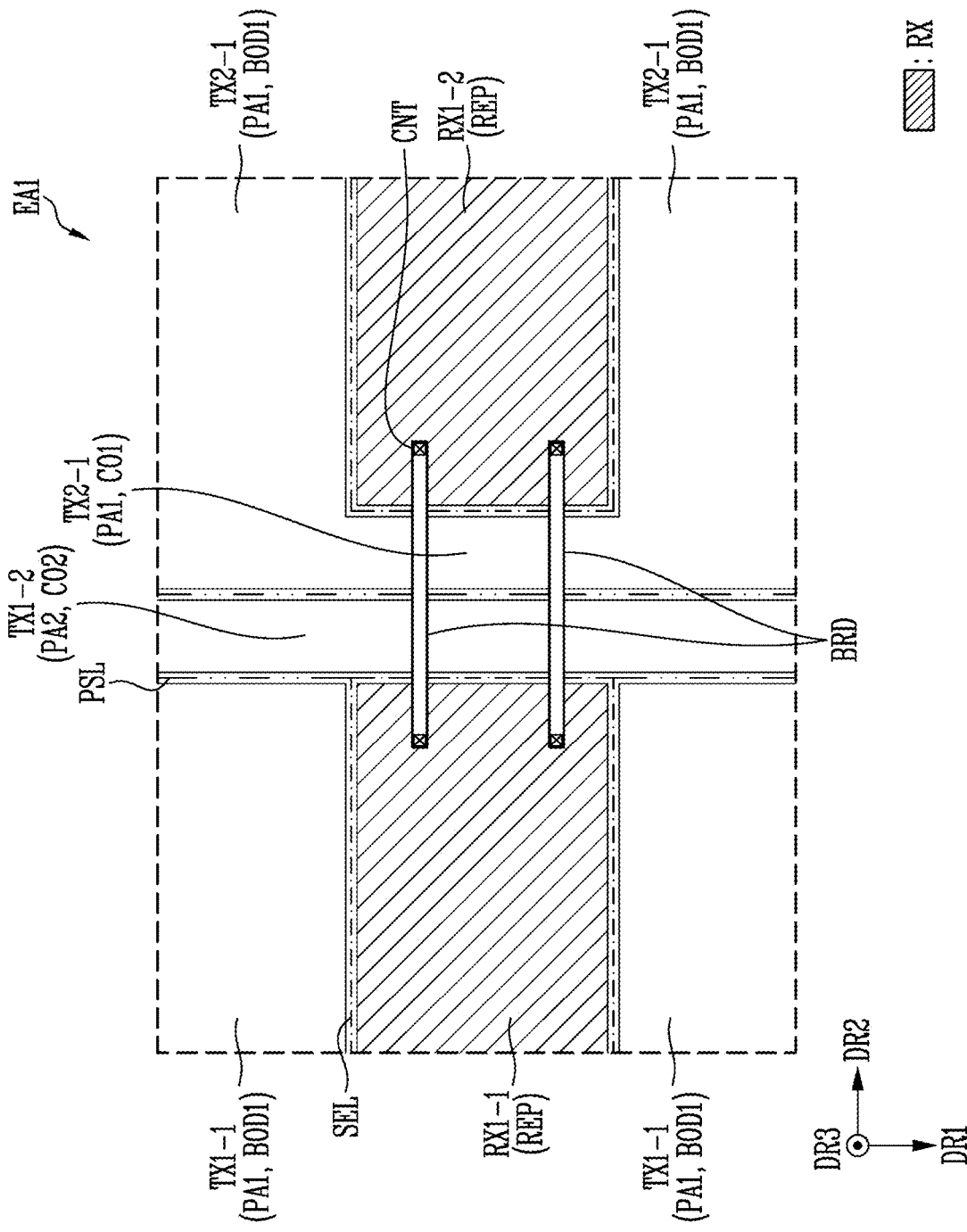
FIGS. 15 and 16 are schematic enlarged views of an area EA1 of FIG. 12.
Figure 16:
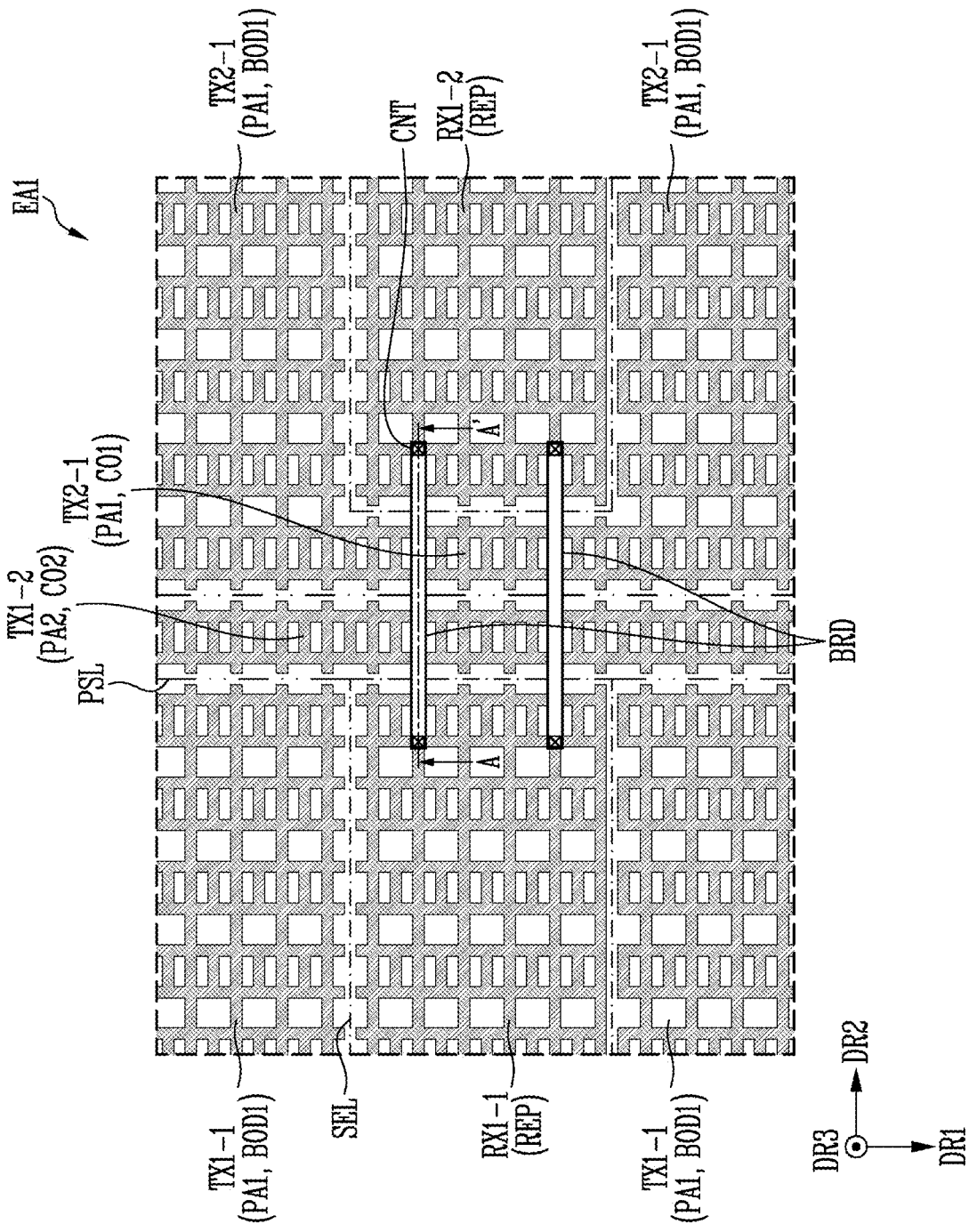

FIGS. 15 and 16 are schematic enlarged views of an area EA1 of FIG. 12. for convenience of description, FIGS. 15 and 16 show a same area, but FIG. 15 may show each area of the transmitter electrode TX and the receiver electrode RX, and FIG. 16 may show each mesh structure of the transmitter electrode TX and the receiver electrode RX.

Figure 17:
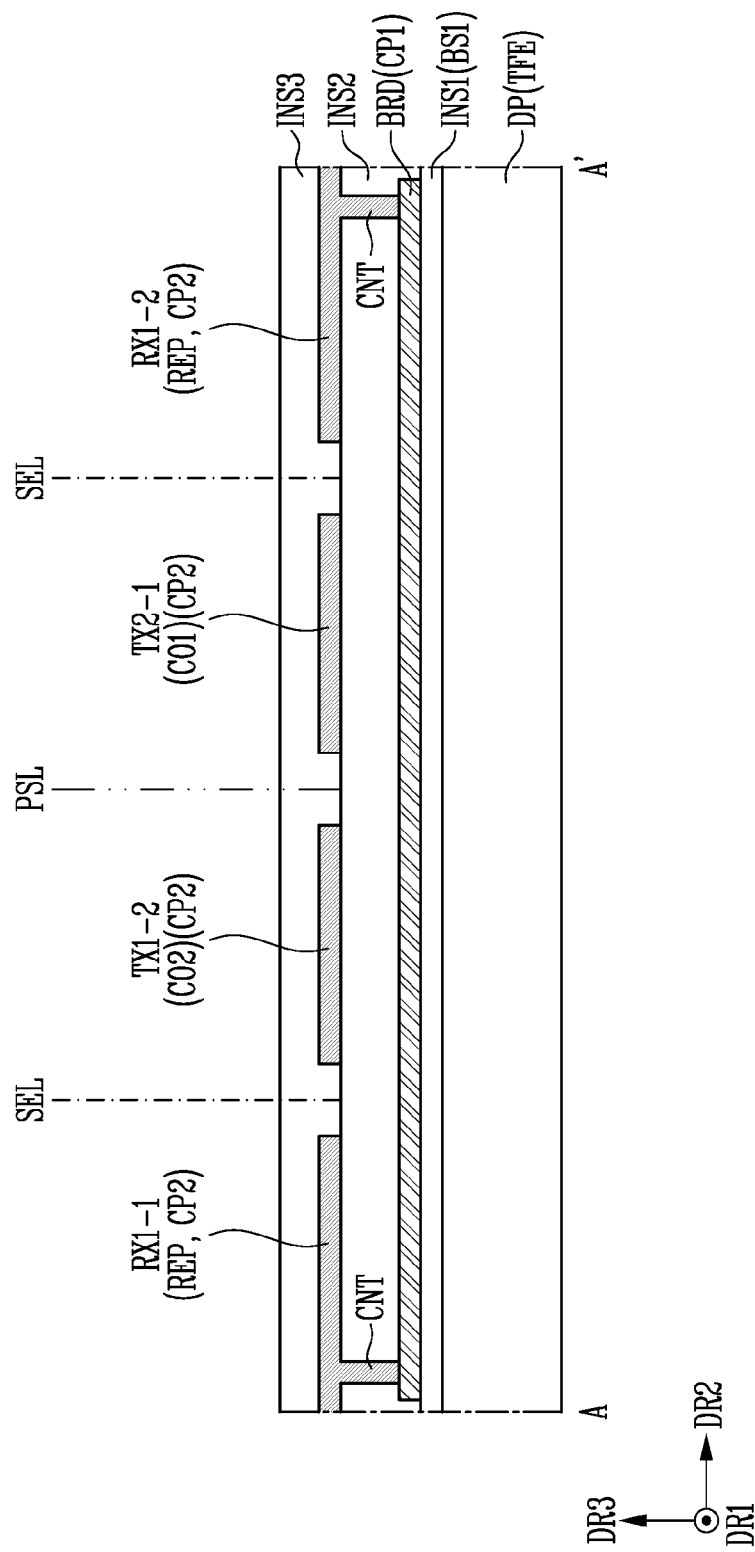
FIG. 17 is a schematic cross-sectional view taken along a line A-A' of FIG. 16.

FIG. 17 is a schematic cross-sectional view taken along a line A-A' of FIG. 16. FIG. 17 schematically shows a cross-sectional structure in which the receiver electrode RX and the transmitter electrode TX are formed.

According to an embodiment, the receiver electrode RX and the transmitter electrode TX may have an approximately quadrangle shape. However, the present disclosure is not limited thereto, and the receiver electrode RX and the transmitter electrode TX may have various shapes. Hereinafter, for convenience of description, the receiver electrode RX and the transmitter electrode TX will be described based on an embodiment in which the receiver electrode RX and the transmitter electrode TX have an approximately quadrangle shape.

According to an embodiment, referring to FIG. 11, the first pair electrode PA1 and the second pair electrode PA2 of the transmitter electrode TX may form a structure that is complementary to each other. Each of the first pair electrode PA1 and the second pair electrode PA2 may face each other in the second direction DR2, and each thereof may include a complementary sawtooth structure. A protruding portion of the first pair electrode PA1 and a retracted portion of the second pair electrode PA2 may face each other, and a protruding portion of the second pair electrode PA2 and a retracted portion of the first pair electrode PA1 may face each other.

For example, the transmitter electrode TX may each include a body portion BOD and a connection portion CO. The body portion BOD and the connection portion CO may be formed integrally with each other. The body portion BOD and the connection portion CO may be connected to each other (e.g., electrically connected). The body portion BOD may have a structure extending in the second direction DR2.

The body portion BOD may include a first body portion BOD1 and a second body portion BOD2. The connection portion CO may include a first connection portion CO1 and a second connection portion CO2.

In this specification, the first body portion BOD1 may be a body portion BOD of the first pair electrode PA1. The second body portion BOD2 may be a body portion BOD of the second pair electrode PA2. In this specification, the first connection portion CO1 may be a connection portion CO of the first pair electrode PA1. The second connection portion CO2 may be the connection portion CO of the second pair electrode PA2.

For example, the 1-1 transmitter electrode TX1-1 may include a first body portion BOD1 and a first connection portion CO1. The 1-2 transmitter electrode TX1-2 may include a second body portion BOD2 and a second connection portion CO2.

Body portions BOD adjacent to each other in the first direction DR1 may be connected by a connection portion CO. The body portions BOD and the connection portions CO may be arranged alternately with each other in the first direction DR1. For example, the first body portions BOD1 and the first connection portions CO1 may be alternately arranged in the first direction DR1. The second body portions BOD2 and the second connection portions CO2 may be alternately arranged in the first direction DR1.

The first body portion BOD1 and the second body portion BOD2 may be alternately arranged in the first direction DR1. Accordingly, in some areas, at least a portion of each of the first pair electrode PA1 and the second pair electrode PA2 may overlap in the first direction DR1.

According to an embodiment, the first body portion BOD1 and the second connection portion CO2 may face each other. The second body portion BOD2 and the first connection portion CO1 may face each other. For example, the first body portion BOD1 and the second connection portion CO2 may be arranged in the second direction DR2, and the second body portion BOD2 and the first connection portion CO1 may be arranged in the second direction DR2.

Accordingly, the first pair electrode PA1 including the first body portion BOD1 and the first connection portion CO1 may be electrically connected to a portion of the transmitter line TW, and the second pair electrode PA2 including the second body portion BOD2 and the second connection portion CO2 may be electrically connected to another portion of the transmitter line TW. For example, the 1-1 transmitter electrode TX1-1 may be electrically connected to the 1-1 transmitter line TW1-1, and the 1-2 transmitter electrode (TX1-2) may be electrically connected to the 1-2 transmitter line TW1-2.

According to an embodiment, referring to FIG. 12, transmitter electrodes TX including pair electrodes PA1 and PA2 including a body portion BOD and a connection portion CO may be arranged in the second direction DR2, and the receiver electrode RX may be disposed in an area where the transmitter electrodes TX are not disposed in the sensing area SA.

For example, the body portion BOD and the connection portion CO may be patterned and disposed in a portion of the sensing area SA, and the receiver electrode RX may be disposed in another portion of the sensing area SA so as not to overlap the body portion BOD and the connection portion CO in a plane view.

According to an embodiment, the third transmitter electrode TX3 may be disposed at a side of the second transmitter electrode TX2. The third transmitter electrode TX3 may include a 3-1 transmitter electrode TX3-1 including a first body electrode BOD1 and a first connection portion CO1 to form the first pair electrode PA1, and a 3-2 transmitter electrode TX3-2 including a second body electrode BOD2 and a second connection portion CO2 to form the second pair electrode PA2.

According to the embodiment, the second transmitter electrode TX2 and the third transmitter electrode TX3 that are disposed adjacent to the first transmitter electrode TX1 and include the first pair electrode PA1 and the second pair electrode PA2 may be electrically connected to the second transmitter line TW2 and the third transmitter line TW3, respectively. The second transmitter line TW2 may be disposed in the non-sensing area NSA and may include the 2-1 transmitter line TW2-1 and the 2-2 transmitter line TW2-2. The third transmitter line TW3 may be disposed in the non-sensing area NSA and may include the 3-1 transmitter line TW3-1 and the 3-2 transmitter line TW3-2.

For example, the 2-1 transmitter line TW2-1 may be electrically connected to the 2-1 transmitter electrode TX2-1, and the 2-2 transmitter line TW2-2 may be electrically connected to the 2-2 transmitter electrode TX2-2. The 3-1 transmitter line TW3-1 may be electrically connected to the 3-1 transmitter electrode TX3-1, and the 3-2 transmitter line TW3-2 may be electrically connected to the 3-2 transmitter electrode TX3-2.

The receiver electrode RX may include receiver electrodes RX disposed in the sensing area SA and each forming a receiver row approximately extending in the second direction DR2.

For example, the receiver electrode RX may include a first receiver electrode RX1, a second receiver electrode RX2, a third receiver electrode RX3, and a fourth receiver electrode RX4 sequentially arranged in the first direction DR1. The first receiver electrode RX1 may form a first receiver row R1. The second receiver electrode RX2 may form a second receiver row R2. The third receiver electrode RX3 may form a third receiver row R3. The fourth receiver electrode RX4 may form a fourth receiver row R4.

According to an embodiment, each of the receiver electrodes RX may overlap the first transmitter electrode TX1, the second transmitter electrode TX2, and the third transmitter electrode TX3 along the first direction DR1.

According to an embodiment, the receiver electrode RX may include receiver electrode portions REP spaced apart from each other along the second direction DR2 in the corresponding receiver row. The body portion BOD of the transmitter electrode TX may be disposed between adjacent receiver electrode portions REP that are spaced apart from each other along the first direction DR1. For example, each of the first to fourth receiver electrodes RX1 to RX4 may include receiver electrode portions REP spaced apart from each other along the first direction DR1 in each of the first to fourth receiver rows R1 to R4, and the first body portion BOD1 or the second body portion BOD2 may be disposed between the receiver electrode portions REP.

According to an embodiment, the receiver electrode RX may include a plurality of receiver electrodes spaced apart from each other and bridges BRD electrically connecting the plurality of receiver electrodes in a corresponding receiver row.

For example, the first receiver electrode RX1 may include a 1-1 receiver electrode RX1-1, a 1-2 receiver electrode RX1-2, and a 1-3 receiver electrode RX1-3 spaced apart from each other along the second direction DR2 and disposed in the first receiver row R1. The second receiver electrode RX2 may include a 2-1 receiver electrode RX2-1, a 2-2 receiver electrode RX2-2, and a 2-3 receiver electrode RX2-3 spaced apart from each other along the second direction DR2 and disposed in the second receiver row R2. The third receiver electrode (RX3) may include a 3-1 receiver electrode RX3-1, a 3-2 receiver electrode (RX3-2), a 3-3 receiver electrode RX3-3 spaced apart from each other along the second direction DR2 and disposed in the third receiver row R3. The fourth receiver electrode RX4 may include a 4-1 receiver electrode RX4-1, a 4-2 receiver electrode RX4-2, and a 4-3 receiver electrode RX4-3 spaced apart from each other along the second direction DR2 and disposed in the fourth receiver row R4.

According to an embodiment, in each of the receiver rows, the receiver electrode RX may include a plurality of receiver electrode portions REP spaced apart from each other along the second direction DR2, and the receiver electrode portions REP may be electrically connected to each other through the bridge BRD. For example, each of the 1-1 receiver electrode RX1-1, the 2-1 receiver electrode RX2-1, the 3-1 receiver electrode RX3-1, and the 4-1 receiver electrode RX4-1 may include receiver electrode portions REP spaced apart from each other in the first direction DR1 in the first transmitter column (e.g., sensing line formed by the first transmitter electrode TX1). Each of the 1-2 receiver electrode RX1-2, the 2-2 receiver electrode RX2-2, the 3-2 receiver electrode RX3-2, and the 4-2 receiver electrode RX4-2 may include receiver electrode portions REP spaced apart from each other in the first direction DR1 in the second transmitter column (e.g., sensing line formed by the second transmitter electrode TX2). Each of the 1-3 receiver electrode RX1-3, the 2-3 receiver electrode RX2-3, the 3-3 receiver electrode RX3-3, and the 4-4 receiver electrode RX4-4 may include receiver electrode portions REP spaced apart from each other in the first direction DR1 in the third transmitter column (e.g., sensing line formed by the third transmitter electrode TX3).

According to an embodiment, the receiver electrode portions REP may overlap the body portion BOD in the first direction DR1. The receiver electrode portions REP may not overlap the connection portion CO in the first direction DR1. Accordingly, the receiver electrode portions REP may be arranged to alternate with the first body portion BOD1 and/or the second body portion BOD2 in each of the transmitter columns.

For example, in the first transmitter column formed by the first transmitter electrode TX1, the receiver electrode portions REP of each of the 1-1 receiver electrode RX1-1, the 2-1 receiver electrode RX2-1, the 3-1 receiver electrode RX3-1, and the 4-1 receiver electrode RX4-1, the first body portion BOD1, and the second body portion BOD2 may overlap in the first direction DR1. In the second transmitter column formed by the second transmitter electrode TX2, the receiver electrode portions REP of each of the 1-2 receiver electrode RX1-2, the 2-2 receiver electrode RX2-2, the 3-2 receiver electrode RX3-2, and the 4-2 receiver electrode RX4-1, the first body portion BOD1, and the second body portion BOD2 may overlap in the first direction DR1. In the third transmitter column formed by the third transmitter electrode TX3, the receiver electrode portions REP of each of the 1-3 receiver electrode RX1-3, the 2-3 receiver electrode RX2-3, the 3-3 receiver electrode RX3-3, and the 4-3 receiver electrode RX4-3, the first body portion BOD1, and the second body portion BOD2 may overlap in the first direction DR1.

The bridge BRD may electrically connect the receiver electrode portions REP spaced apart in the second direction DR2. The bridge BRD may be disposed on a different layer from the receiver electrode portions REP and the transmitter electrodes TX.

For example, the bridge BRD may be formed by the first conductive pattern layer CP1, and the receiver electrode portions REP and transmitter electrodes TX may be formed by the second conductive pattern layer CP2.

Meanwhile, according to an embodiment, refers to FIG. 14, the transmitter electrode TX and the receiver electrode RX may have a mesh structure. For example, the transmitter electrode TX and the receiver electrode RX may include a mesh structure formed by the second conductive pattern layer CP2.

According to an embodiment, the bridge BRD may electrically connect the receiver electrode portions REP so that the receiver electrode portions REP can form a receiver row. According to an embodiment, the bridge BRD may overlap the connection portion CO in a plane view.

According to an embodiment, the receiver electrode portions REP may n be electrically spaced apart from the transmitter electrode TX. In a plan view, the bridge BRD may overlap at least a portion of the transmitter electrode TX and electrically connect the receiver electrode portions REP that are spaced apart from each other. With reference to FIGS. 15 to 17, a conductive structure formed adjacent to the bridge BRD to form the sensing electrode SP will be described.

Referring to FIGS. 15 to 17, the transmitter electrode TX and the receiver electrode RX may be spaced apart from each other with a separation line SEL interposed therebetween. For example, the transmitter electrode TX and the receiver electrode RX may be formed by the second conductive pattern layer CP2 disposed on a same layer, may be spaced apart from each other with the separation line SEL interposed therebetween, and may form paths through which different electrical signals are applied.

According to an embodiment, the first pair electrode PA1 and the second pair electrode PA2 may be spaced apart from each other with a pair separation line PSL interposed therebetween. For example, the first pair electrode PA1 and the second pair electrode PA2 may be formed by the second conductive pattern layer CP2 disposed on a same layer, may be spaced apart from each other with the pair separation line PSL therebetween, and may form paths through which different driving signals are applied.

According to an embodiment, the bridge BRD may be formed by the first conductive pattern layer CP1 and may electrically connect the receiver electrode portions REP that are spaced apart from each other.

For example, the bridge BRD may generally extend in the second direction DR2 and may be electrically connected to adjacent receiver electrode portions REP in the second direction DR2. For example, a portion of the bridge BRD may be electrically connected to the receiver electrode portion REP of the 1-1 receiver electrode RX1-1 through a contact portion CNT. Another portion of the bridge BRD may be electrically connected to the receiver electrode portion REP of the 1-2 receiver electrode RX1-2 through the contact portion CNT.

According to an embodiment, the bridge BRD may not extend in the first direction DR1. According to an embodiment, the bridge BRD may not include a bent portion. For example, the bridge BRD may extend in the second direction DR2 different from the first direction DR1 without extending in the first direction DR1.

For example, according to the structure of the receiver electrodes RX and the transmitter electrodes RX described above, even if the bridge BRD does not extend in the first direction DR1 in which the receiver electrodes RX are spaced apart from each other, the receiver rows may be suitably defined.

In addition, according to an embodiment, the bridges BRD may be uniformly disposed throughout the sensing area SA. For example, the bridges BRD may be arranged sequentially in the first direction DR1 and sequentially in the second direction DR2.

Experimentally, when a portion of the bridges BRD are bent or the bridges BRD are locally arranged in some areas, there may be a risk of visibility being impaired due to the arrangement structure of the bridges BRD.

However, according to an embodiment, the bridges BRD may not be bent and the bridges BRD may be arranged regularly in the sensing area SA, so that the risk of visibility being impaired can be substantially reduced due to the sensing part TSP.

Next, with reference to FIGS. 18 to 20, the display device DD including the sensing part TSP according to an embodiment will be described. Duplicate description is briefly explained or not repeated.

Figure 18:
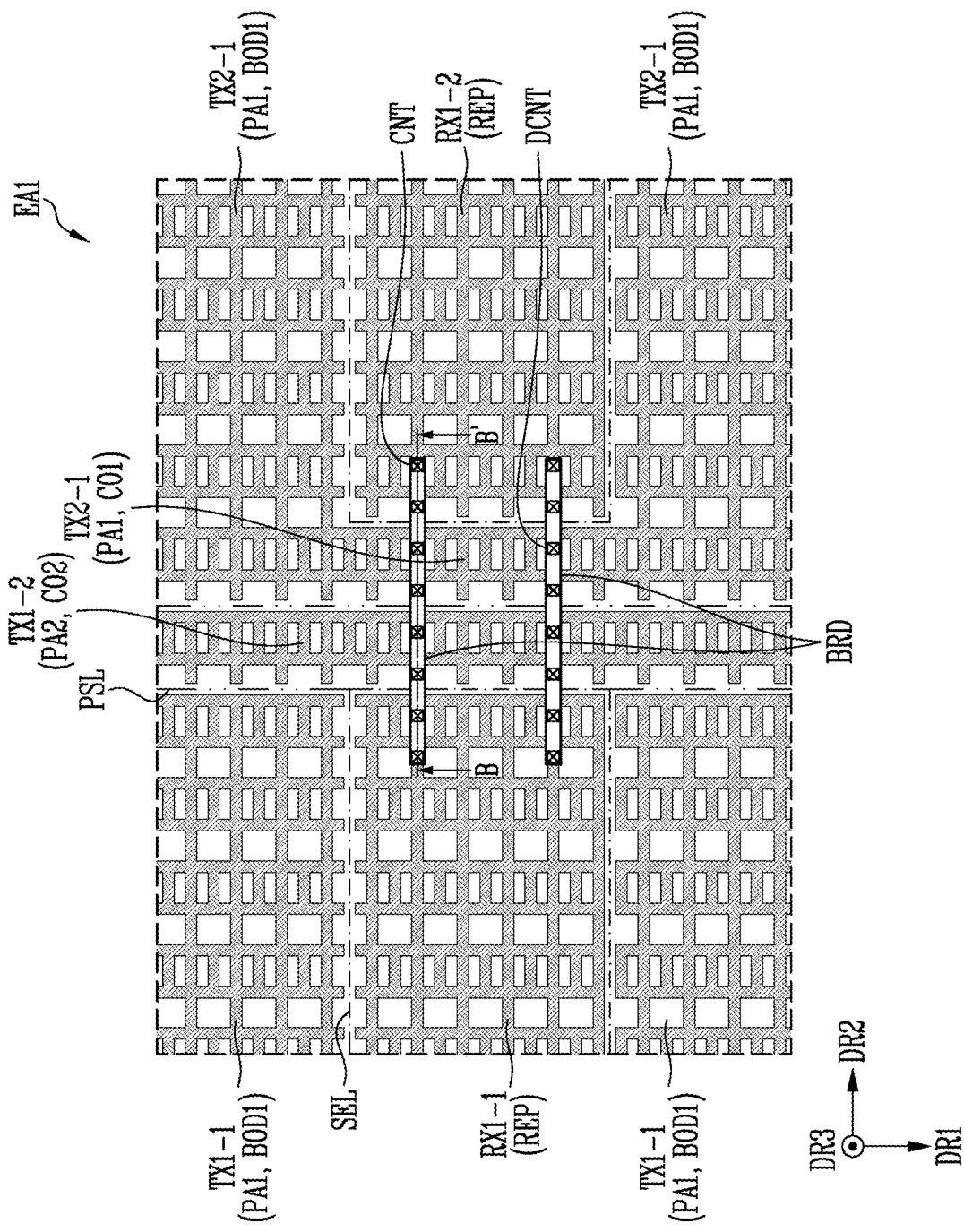
FIGS. 18, 19 and 20 are drawings showing a sensing part including a dummy contact portion according to an embodiment.
Figure 19:
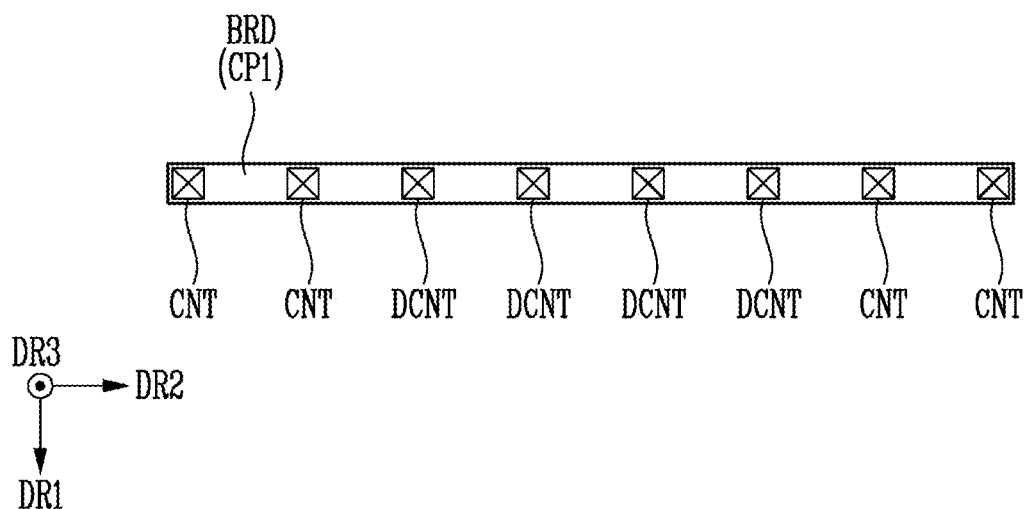
Figure 20:
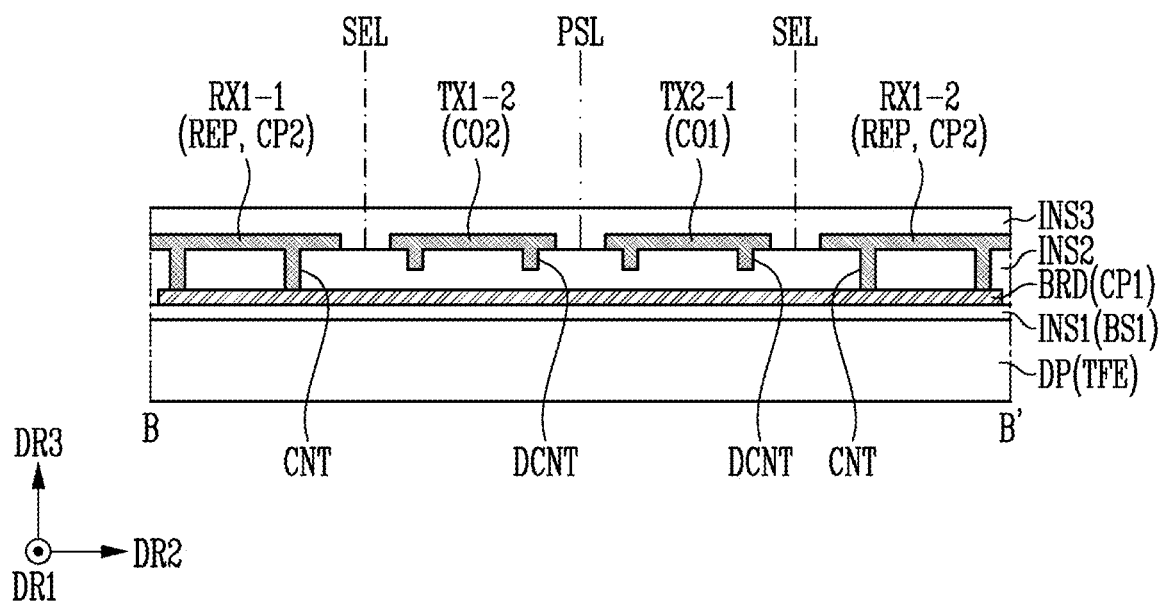

FIGS. 18 to 20 are drawings showing a sensing part including a dummy contact portion according to an embodiment. FIG. 18 is a schematic plan view showing a sensing part TSP according to an embodiment, and schematically shows areas corresponding to structures shown in FIGS. 15 and 16. FIG. 19 is a plan view schematically showing a contact portion CNT and a dummy contact portion DCNT according to an embodiment. FIG. 20 is a schematic cross-sectional view taken along a line B-B' of FIG. 18, and schematically shows an area corresponding to a structure shown in FIG. 17.

Referring to FIGS. 18 to 20, the sensing part TSP according to the embodiment may further include a dummy contact portion DCNT.

According to an embodiment, the bridge BRD may be electrically connected to the adjacent receiver electrode portion REP through the contact portion CNT, and the sensing part TSP according to the embodiment may further include a dummy contact portion DCNT overlapping the bridge BRD in a plan view.

The dummy contact portion DCNT may include a plurality of dummy contact portions DCNT. The dummy contact portions DCNT may be disposed between the contact portions CNT in the second direction DR2.

According to an embodiment, the dummy contact portion DCNT may have a structure corresponding to the contact portion CNT, and may have a structure that does not form an actual contact structure that electrically connects the second conductive pattern layer CP2 and the first conductive pattern layer CP1.

For example, the dummy contact portion DCNT may have a structure that is recessed into a portion of the second insulating layer INS2, and a hole forming the dummy contact portion DCNT may not expose the bridge BRD.

According to an embodiment, as the dummy contact portion DCNT is formed, the risk of visibility being impaired due to the contact portion CNT can be reduced. For example, when contact portions CNT are selectively formed only in positions where an electrical connection between the first conductive pattern layer CP1 and the second conductive pattern layer CP2 is required, there may be a risk of visibility being reduced as the contact portions CNT are locally formed in some areas. However, as the dummy contact portion DCNT is formed, the contact portions CNT and the dummy contact portions DCNT may be defined as being arranged generally uniformly, and thus the risk of visibility being impaired due to the contact portions CNT can be reduced.

As described above, while the present disclosure has been shown and described with reference to certain embodiments thereof, it will be understood by those skilled in the art that various changes in forms and details may be made therein without departing from the spirit and scope of the present disclosure as defined by the appended claims and their equivalents.

Accordingly, the technical scope of the present disclosure may be determined by on the technical scope of the accompanying claims.

What is claimed is:

1. A display device comprising:
a display part configured to emit light; and
a sensing part disposed on the display part and including transmitter electrodes transmitting driving signals and extending in a first direction and receiver electrodes receiving sensing signals and extending in a second direction different from the first direction,
wherein each of the transmitter electrodes includes a first pair electrode and a second pair electrode which are disposed in a transmitter column and are spaced apart from each other in the second direction,
wherein the first pair electrode includes first body portions and first connection portions each of which connects adjacent first body portions, the first connecting portions being formed integrally with the first body portions,
wherein the second pair electrode includes second body portions and second connection portions each of which connects adjacent second body portions, the second connecting portions being formed integrally with the second connection portion, and
wherein the first body portions and the second body portions are interdigitated along the first direction.

2. The display device of claim 1, further comprising a sensor driver configured to drive the sensing part,
wherein the sensor driver drives the sensing part by a frequency division multiplexing (FDM) driving method.

3. The display device of claim 2, wherein the sensor driver includes a multi-frequency generator, a sensor receiver electrically connected to the receiver electrodes, and a sensor transmitter electrically connected to the transmitter electrodes,
wherein the multi-frequency generator generates a first frequency signal and a second frequency signal having different frequencies, and
wherein the sensor transmitter generates a first driving signal based on the first frequency signal and a second driving signal based on the second frequency signal.

4. The display device of claim 3, wherein the first driving signal and the second driving signal are differential signals.

5. The display device of claim 4, wherein the first pair electrode and the second pair electrode form one transmitter column.

6. The display device of claim 5, wherein the display device includes a sensing area in which the transmitter electrodes and the receiver electrodes are disposed, and a non-sensing area surrounding at least a portion of the sensing area,
wherein the display device further includes transmitter lines disposed in the non-sensing area and electrically connected to the transmitter electrodes, respectively; and
wherein the transmitter lines are electrically connected to the first pair electrode and the second pair electrode, respectively.

7. The display device of claim 6, wherein the first pair electrode and the second pair electrode are electrically separated from each other.

8. The display device of claim 1, wherein each of the receiver electrodes includes receiver electrode portions spaced apart in the second direction and a bridge electrically connecting the receiver electrode portions.

9. The display device of claim 8, wherein the receiver electrode portions overlap the first body portion and the second body portion in the first direction.

10. The display device of claim 8, wherein the bridge extends in the second direction.

11. The display device of claim 10, wherein the bridge does not extend in the first direction.

12. The display device of claim 10, wherein the transmitter electrodes and the receiver electrodes are comprised of a conductive pattern layer,
wherein the conductive pattern layer includes a first conductive pattern layer and a second conductive pattern layer disposed on the first conductive pattern layer,
wherein the bridge is formed of the first conductive pattern layer,
wherein the receiver electrode portions are formed of the second conductive pattern layer, and
wherein the transmitter electrodes are formed of the second conductive pattern layer.

13. The display device of claim 12, wherein the sensing part further includes an insulating layer disposed between the first conductive pattern layer and the second conductive pattern layer, and
wherein the bridge is electrically connected to the receiver electrodes through a contact portion formed through the first insulating layer.

14. The display device of claim 13, further comprising an additional contact portion,
wherein the sensing part further includes a dummy contact portion in which the first insulating layer is partially removed not to expose the first conductive pattern, and
wherein the dummy contact portion overlaps the bridge in a plane view and is disposed between the contact portions and the additional contact portion.

15. The display device of claim 8, wherein the receiver electrode portions include a plurality of receiver electrode portions spaced apart in the second direction and disposed in a single receiver row.

16. The display device of claim 8, wherein the receiver electrode portions include a plurality of receiver electrode portions spaced apart in the first direction and disposed in a single receiver column.

17. The display device of claim 8, wherein the first pair electrode, the second pair electrode, and the receiver electrode portions are formed of a same conductive layer, are formed on a same plane, and are electrically separated from each other.

18. The display device of claim 1, wherein each of the first pair electrode and the second pair electrode includes a sawtooth structure formed complementary to each other.

19. A display device comprising:
a light emitting element disposed on a base layer; and
a sensing part disposed on the base layer and including transmitter electrodes transmitting driving signals and receiver electrodes receiving sensing signals and extending in different directions,
wherein the sensing part is driven by a frequency division multiplexing (FDM) driving method,
wherein the transmitter electrodes include a first pair electrode and a second pair electrode spaced apart from each other in a direction and disposed in a corresponding transmitter column, and
wherein each of the first pair electrode and the second pair electrode includes a sawtooth structure formed complementary to each other.

* * * * *